United States Patent
Cherian et al.

(10) Patent No.: US 12,069,723 B2
(45) Date of Patent: Aug. 20, 2024

(54) SCHEDULING WIRELESS STATIONS WITHIN A TARGET WAKE TIME SERVICE PERIOD

(71) Applicant: QUALCOMM Incorporated, San Diego, CA (US)

(72) Inventors: George Cherian, San Diego, CA (US); Alfred Asterjadhi, San Diego, CA (US); Yanjun Sun, San Diego, CA (US); Sai Yiu Duncan Ho, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/461,670

(22) Filed: Aug. 30, 2021

(65) Prior Publication Data

US 2022/0078844 A1 Mar. 10, 2022

Related U.S. Application Data

(60) Provisional application No. 63/081,886, filed on Sep. 22, 2020, provisional application No. 63/076,358, filed on Sep. 9, 2020.

(51) Int. Cl.
*H04W 74/0808* (2024.01)
(52) U.S. Cl.
CPC .............. *H04W 74/0808* (2013.01)
(58) Field of Classification Search
CPC ............................................. H04W 74/0808
See application file for complete search history.

(56) References Cited

U.S. PATENT DOCUMENTS 11,737,021 B2 8/2023 Ho et al.
2015/0327262 A1* 11/2015 Kwon ............... H04W 72/0446
370/329

(Continued)

FOREIGN PATENT DOCUMENTS

WO WO-2018174978 A2 9/2018

OTHER PUBLICATIONS

Chunyu Hu et al., Prioritized EDCA channel access—slot management, Sep. 8, 2020, IEEE, 1046 Rev 4 (Year: 2020).*

(Continued)

*Primary Examiner* — Mohammad S Adhami
(74) *Attorney, Agent, or Firm* — Arun Swain

(57) ABSTRACT

In some implementations, an access point (AP) establishes a restricted target wake time (TWT) session including at least one restricted TWT service period (SP) for peer-to-peer (P2P) communications. The AP admits a group of wireless stations (STAs) associated with P2P communications as members of the restricted TWT session, obtains a transmission opportunity (TXOP) on the wireless channel during the at least one restricted TWT SP, and transmits, on the wireless channel, a protection frame identifying one or more STAs of the group of STAs belonging to the restricted TWT session that are permitted to transmit or receive P2P communications on the wireless channel during the TXOP. The protection frame may also indicate to receiving devices other than the one or more identified STAs that the wireless channel is unavailable for at least a portion of the TXOP.

30 Claims, 18 Drawing Sheets

(56) References Cited

U.S. PATENT DOCUMENTS

| | | | | |
|---|---|---|---|---|
| 2017/0311258 A1* | 10/2017 | Asterjadhi | ........ | H04W 28/0221 |
| 2021/0153125 A1* | 5/2021 | Cariou | .............. | H04W 52/0235 |
| 2021/0329500 A1* | 10/2021 | Cariou | ................ | H04W 74/002 |
| 2023/0292363 A1* | 9/2023 | Sundman | .............. | H04W 74/04 |
| 2023/0308938 A1* | 9/2023 | Sun | ................... | H04W 28/0278 |

OTHER PUBLICATIONS

International Search Report and Written Opinion—PCT/US2021/048431—ISA/EPO—Jan. 4, 2022.

Khorov E., et al., "Current Status and Directions of IEEE 802.11be, the Future Wi-Fi 7", IEEE Access, IEEE, USA, vol. 8, May 7, 2020 (May 7, 2020), XP011789411, pp. 88664-88688, DOI: 10.1109/ACCESS.2020.2993448 [retrieved on May 19, 2020] the whole document, line 8, paragraph 4-right-hand column, line 17.

* cited by examiner

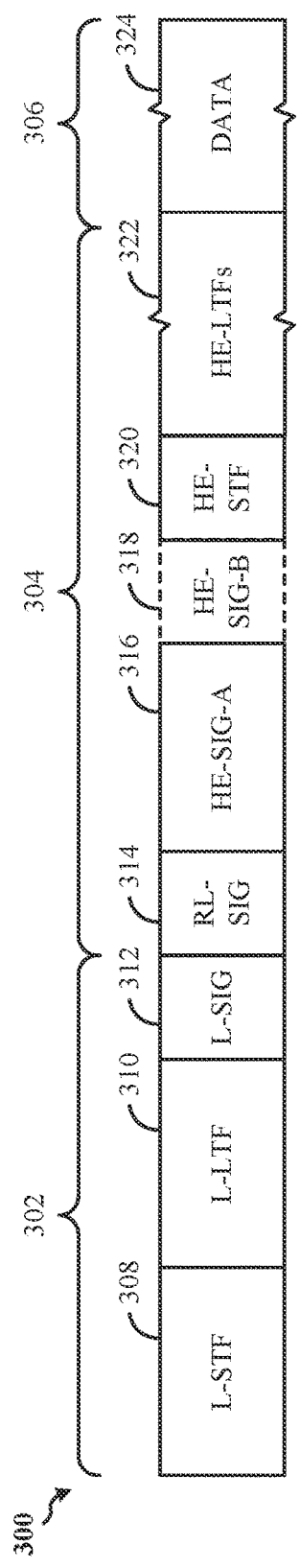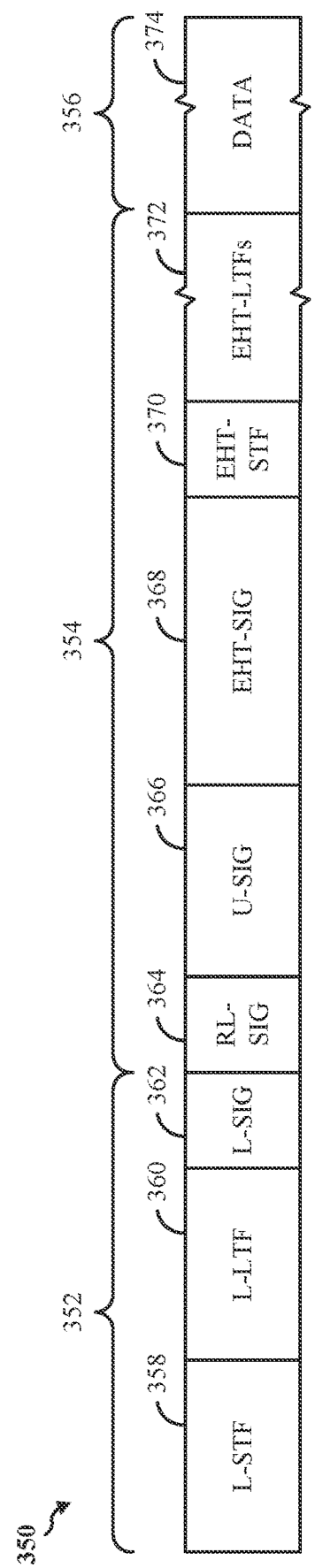
Figure 3A
Figure 3B

1700

| Element ID (1702) | Length (1704) | Control (1706) | TWT Parameter Information (1708) |

| Request Type (1712) | Target Wake Time (1714) | Nominal Minimum TWT Wake Duration (1716) | TWT Wake Interval Mantissa (1717) | Broadcast TWT Info (1718) |

| TWT Request (1722) | TWT Setup Command (1724) | Trigger (1726) | Last Broadcast Parameter Set (1728) | Flow Type (1730) | Broadcast TWT Recommendation (1732) | TWT Wake Interval Exponent (1734) | Reserved (1736) |

| Frame Control (1801) | Duration (1802) | RA (1803) | TA (1804) | Common Info (1805) | User Info 1 (1806(1)) | ... (1806(2)) | User Info n (1806(n)) | Padding (1807) | FCS (1808) |

*Figure 18*

SCHEDULING WIRELESS STATIONS WITHIN A TARGET WAKE TIME SERVICE PERIOD

CROSS-REFERENCE TO RELATED APPLICATIONS

This Patent Application claims priority to U.S. Provisional Patent Application No. 63/076,358 filed on Sep. 9, 2020, and claims priority to U.S. Provisional Patent Application No. 63/081,886 filed on Sep. 22, 2020, all of which are assigned to the assignee hereof. The disclosures of all prior Applications are considered part of and are incorporated by reference in this Patent Application.

TECHNICAL FIELD

This disclosure relates generally to wireless communications, and more specifically, to allocating resources of a wireless network to one or more wireless communication devices during a restricted target wake time (TWT) service period (SP).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Some wireless communication devices may be associated with peer-to-peer (P2P) communications. P2P communications may be associated with real time applications that have stringent latency requirements (such as very low average latency, worst case latency of a few to tens of milliseconds, and small jitter) and specific throughput requirements. It is desirable for WLANs to ensure that P2P communications can be handled in a manner that minimizes latency and satisfies any specified performance requirements.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication by a wireless communication device operating an access point (AP). In some implementations, the method includes establishing a restricted target wake time (TWT) session on a wireless channel, the restricted TWT session including at least one restricted TWT service period (SP) for peer-to-peer (P2P) communications. The method includes admitting a group of wireless stations (STAs) associated with P2P communications as members of the restricted TWT session, obtaining a transmission opportunity (TXOP) on the wireless channel during the at least one restricted TWT SP, and transmitting a protection frame on the wireless channel. The protection frame may identify one or more STAs of the group of STAs belonging to the restricted TWT session that are permitted to transmit or receive P2P communications on the wireless channel during the TXOP. The protection frame may also indicate to receiving devices other than the one or more identified STAs that the wireless channel is unavailable for at least a portion of the TXOP. In some instances, the STAs identified by the protection frame include less than all of the STAs in the group of STAs belonging to the restricted TWT session.

In some implementations, the method may also include determining that at least two of the identified STAs are associated with a P2P link, and allocating time or frequency resources to the at least two STAs during at least a portion of the restricted TWT SP. In some instances, the P2P link includes a tunneled direct-link setup (TDLS) link on the wireless channel.

In some implementations, the protection frame includes a clear-to-send (CTS) frame or a CTS-to-self frame indicating that the other receiving devices are to set their respective network allocation vectors (NAVs) to a time period that is smaller than the TXOP. In some instances, the time period covers a transmission airtime of a scheduling frame transmitted by the AP plus one of a point coordination function (PCF) interframe space (PIFS) duration, an extended interframe space (EIFS) duration, or an acknowledgement (ACK) time-out period. In some other implementations, the protection frame indicates that each STA of the group of STAs belonging to the restricted TWT session and not identified by the protection frame is to enter a power-save (PS) mode based on reception of the protection frame. In some instances, the protection frame indicates a period of time during which each STA of the group of STAs belonging to the restricted TWT session and not identified by the protection frame is to remain in the PS mode. In some other instances, the protection frame includes a trigger frame including an association identifier (AID) of each STA of the one or more identified STAs.

In some implementations, the method may also include transmitting one or more scheduling frames on the wireless channel during the TXOP. Each scheduling frame may be configured to schedule a respective STA identified by the protection frame for P2P transmissions on the wireless channel during a respective scheduled opportunity within the TXOP. In some instances, each scheduling frame indicates that receiving devices other than the respective STA are to set their respective NAVs to a duration of the respective scheduled opportunity. In some other instances, each scheduling frame includes a trigger frame including a Per User Info field indicating a transmission schedule of the respective STA. In some aspects, the Per User Info field may also indicate an allowed duration of P2P transmissions to or from the respective STA.

In some implementations, the method may also include sensing the wireless channel during a respective scheduled opportunity, and recovering the TXOP from the respective STA based on detecting an absence of P2P transmissions during the respective scheduled opportunity. In some other implementations, the method may also include receiving a frame from one or more of the STAs identified by the protection frame based on a respective scheduling frame, determining whether a duration of a network allocation vector (NAV) included in the received frame is less than a NAV duration indicated by the respective scheduling frame, and scheduling transmission of a next scheduling frame of the one or more scheduling frames in response to determining that the NAV duration included in the received frame is less than the NAV duration indicated by the respective scheduling frame. In some instances, a timing of the transmission of the next scheduling frame may be based on an end of the NAV duration included in the received frame.

Another innovative aspect of the subject matter described in this disclosure can be implemented in a wireless AP. The AP may include at least one modem, at least one processor communicatively coupled with the at least one modem, and at least one memory communicatively coupled with the at least one processor. The at least one memory may store processor-readable code that, when executed by the at least one processor in conjunction with the at least one modem, is configured to establish a restricted TWT session on a wireless channel, the restricted TWT session including at least one restricted TWT SPs for P2P communications. Execution of the processor-readable code is configured to admit a group of wireless STAs associated with P2P communications as members of the restricted TWT session, to obtain a transmission opportunity (TXOP) on the wireless channel during the at least one restricted TWT SP, and to transmit a protection frame on the wireless channel. The protection frame may identify one or more STAs of the group of STAs belonging to the restricted TWT session that are permitted to transmit or receive P2P communications on the wireless channel during the TXOP. The protection frame may also indicate to receiving devices other than the one or more identified STAs that the wireless channel is unavailable for at least a portion of the TXOP. In some instances, the STAs identified by the protection frame include less than all of the STAs in the group of STAs belonging to the restricted TWT session.

In some implementations, execution of the processor-readable code may also be configured to determine that at least two of the identified STAs are associated with a P2P link, and to allocate time or frequency resources to the at least two STAs during at least a portion of the restricted TWT SP. In some instances, the P2P link includes a tunneled direct-link setup (TDLS) link on the wireless channel.

In some implementations, the protection frame includes a CTS frame or a CTS-to-self frame indicating that the other receiving devices are to set their respective NAVs to a time period that is smaller than the TXOP. In some instances, the time period covers a transmission airtime of a scheduling frame transmitted by the AP plus one of a PIFS duration, an EIFS duration, or an ACK time-out period. In some other implementations, the protection frame indicates that each STA of the group of STAs belonging to the restricted TWT session and not identified by the protection frame is to enter a power-save (PS) mode based on reception of the protection frame. In some instances, the protection frame indicates a period of time during which each STA of the group of STAs belonging to the restricted TWT session and not identified by the protection frame is to remain in the PS mode. In some other instances, the protection frame includes a trigger frame including an AID of each STA of the one or more identified STAs.

In some implementations, execution of the processor-readable code may also be configured to transmit one or more scheduling frames on the wireless channel during the TXOP. Each scheduling frame may be configured to schedule a respective STA identified by the protection frame for P2P transmissions on the wireless channel during a respective scheduled opportunity within the TXOP. In some instances, each scheduling frame indicates that receiving devices other than the respective STA are to set their respective NAVs to a duration of the respective scheduled opportunity. In some other instances, each scheduling frame includes a trigger frame including a Per User Info field indicating a transmission schedule of the respective STA. In some aspects, the Per User Info field may also indicate an allowed duration of P2P transmissions to or from the respective STA.

In some implementations, execution of the processor-readable code may also be configured to sense the wireless channel during a respective scheduled opportunity, and to recover the TXOP from the respective STA based on detecting an absence of P2P transmissions during the respective scheduled opportunity. In some other implementations, execution of the processor-readable code may also be configured to receive a frame from one or more of the STAs identified by the protection frame based on a respective scheduling frame, to determine whether a duration of a NAV included in the received frame is less than a NAV duration indicated by the respective scheduling frame, and to schedule transmission of a next scheduling frame of the one or more scheduling frames in response to determining that the NAV duration included in the received frame is less than the NAV duration indicated by the respective scheduling frame. In some instances, a timing of the transmission of the next scheduling frame may be based on an end of the NAV duration included in the received frame.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims.

FIG. 3A shows another example PDU usable for communications between an AP and one or more STAs.

FIG. 3B shows another example PDU usable for communications between an AP and one or more STAs.

FIG. 17A shows an example structure of a TWT Element usable for wireless communications according to some implementations.

FIG. 17B shows an example structure of a broadcast TWT Parameter Set field usable for wireless communications according to some implementations.

FIG. 17C shows an example structure of a Request Type field in a Broadcast TWT Parameter Set field usable for wireless communications according to some implementations.

FIG. 18 shows an example structure of a trigger frame usable for wireless communications according to some implementations.

Like reference numbers and designations in the various drawings indicate like elements.

DETAILED DESCRIPTION

Figure 1:
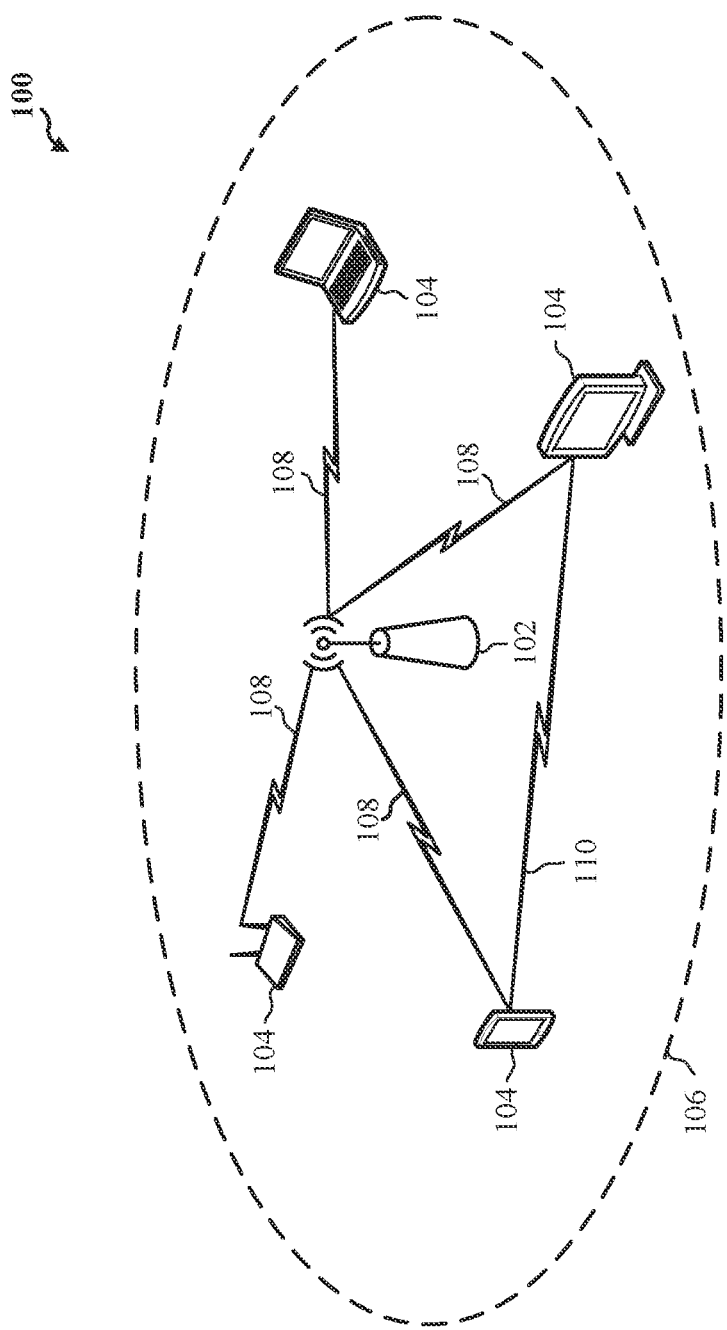
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to restricted target wake time (TWT) sessions on a wireless channel. Some implementations more specifically relate to establishing a restricted TWT session for peer-to-peer (P2P) traffic. In some implementations, an AP may establish, on a wireless channel, a restricted TWT session including at least one restricted TWT SP during which the AP reserves the wireless channel for P2P communications. The AP may admit a group of STAs associated with P2P communications as members of the restricted TWT session. The AP may obtain a transmission opportunity (TXOP) on the wireless channel, and may transmit a protection frame on the wireless channel. The protection frame may identify one or more STAs of the group of STAs belonging to the restricted TWT session that are permitted to transmit or receive P2P communications on the wireless channel during the TXOP. In some implementations, the protection frame may indicate that the wireless channel is busy or unavailable to receiving devices other than the one or more identified STAs for at least a portion of the TXOP. In some instances, the protection frame may be a clear-to-send (CTS) frame or a CTS-to-self frame indicating that the other receiving devices are to set their respective network allocation vectors (NAVs) to a time period that is smaller than the TXOP. In some other instances, the protection frame may be a trigger frame including an AID of each STA of the one or more identified STAs.

In various implementations, the AP may transmit one or more scheduling frames on the wireless channel during the TXOP. Each scheduling frame may be configured to schedule a respective STA identified by the protection frame for P2P transmissions on the wireless channel during a respective scheduled opportunity within the TXOP. Each scheduling frame may also indicate that receiving devices other than the respective STA are to set their respective NAVs to a duration of the respective scheduled opportunity. In some instances, each scheduling frame may be a trigger frame including a Per User Info field indicating a transmission schedule of the respective STA. In some aspects, the Per User Info field may also indicate an allowed duration of P2P transmissions to or from the respective STA. In some implementations, the AP may receive a frame from one or more of the identified STAs based on a respective scheduling frame, and may schedule transmission of a next scheduling frame in response to determining that the NAV duration included in the received frame is less than the NAV duration indicated by the respective scheduling frame.

Particular implementations of the subject matter described in this disclosure can be implemented to realize one or more of the following potential advantages. By establishing a restricted TWT session for STAs associated with P2P communications or P2P links, the AP may use enhanced channel access mechanisms, resource reservation mechanisms, and scheduling techniques to provide more predictable latencies, reduced worst-case latency, reduced jitter, and increased throughput for STAs that are members of the restricted TWT session. In this way, the AP may ensure that such STAs are afforded sufficient access to the wireless channel to meet the strict end-to-end latency, throughput, and packet loss requirements associated with P2P communications.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHZ band, and the 900 MHz band. Some implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
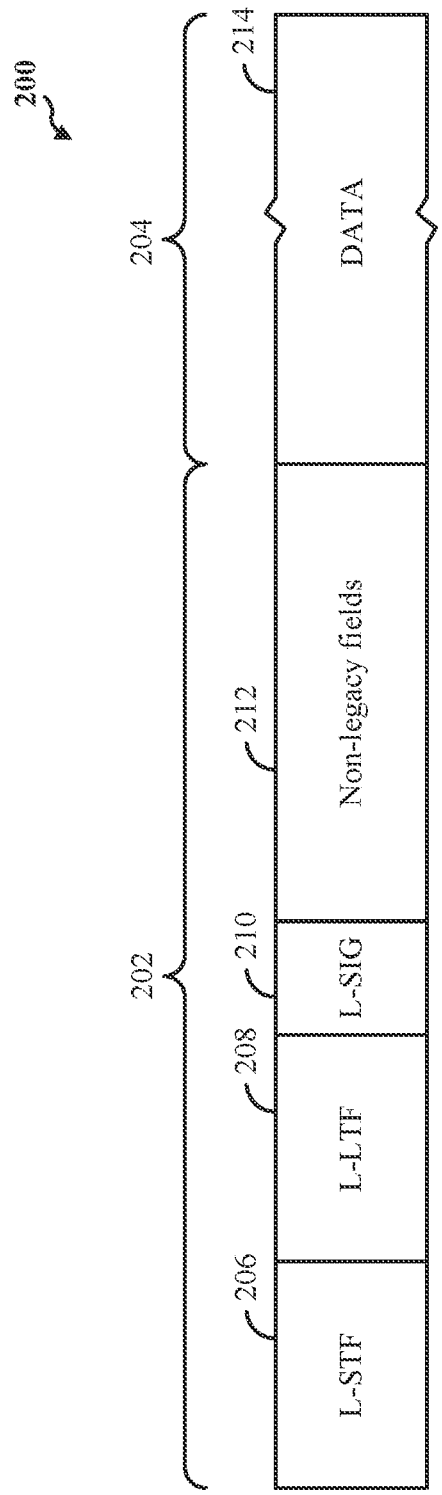
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include one or more non-legacy fields 212. The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208, and the L-SIG 210 may be modulated according to a binary phase shift keying (BPSK) modulation scheme. The payload 204 may carry data 214, and may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
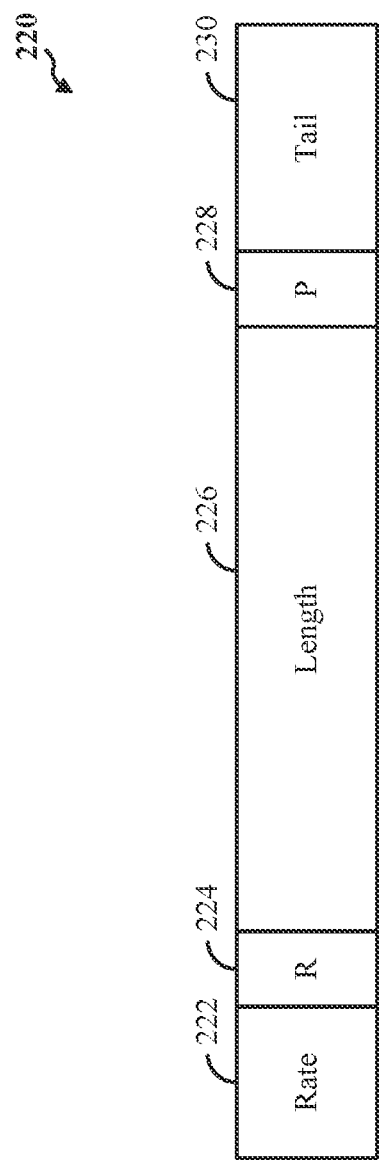
FIG. 2B shows an example field in the PDU of FIG. 2A.

FIG. 2B shows an example L-SIG 220 in the PDU of FIG. 2A. The L-SIG 220 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, bytes. The parity bit 228 is used to detect bit errors. The tail field 230 includes tail bits that are used by the receiving device to terminate operation of a decoder (for example, a Viterbi decoder). The receiving device utilizes the data rate and the length indicated in the data rate field 222 and the length field 226 to determine a duration of the packet in units of, for example, microseconds (μs).

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

Figure 4:
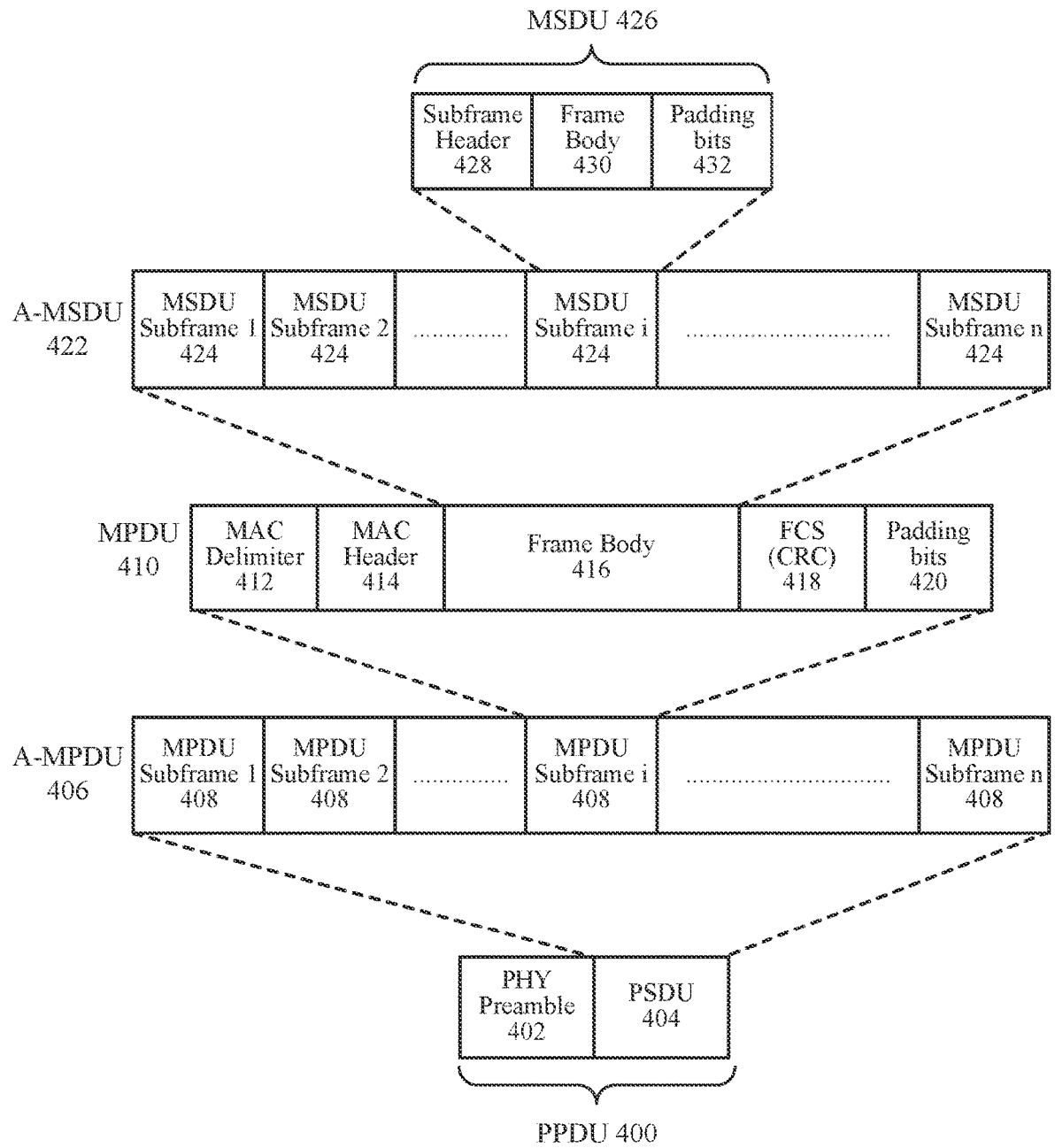
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs), for example, such as an aggregated MPDU (A-MPDU) 406 that includes multiple MPDU subframes 408. Each MPDU subframe 408 may carry an MPDU 410 including a MAC delimiter 412 and a MAC header 414 prior to the accompanying frame body 416, which includes the data portion or "payload" of the MPDU. The frame body 416 may carry one or more MAC service data units (MSDUs), for example, such as an aggregated MSDU (A-MSDU) 422 that includes multiple MSDU subframes 424. Each MSDU subframe 424 contains a corresponding MSDU 426 including a subframe header 428, a frame body 430, and one or more padding bits 432.

Referring back to the MPDU 410, the MAC header 414 may include a number of fields containing information that defines or indicates characteristics or attributes of data encapsulated within the frame body 416. The MAC header 414 also includes a number of fields indicating addresses for the data encapsulated within the frame body 416. For example, the MAC header 414 may include a combination of a source address, a transmitter address, a receiver address, or a destination address. The MAC header 414 may include a frame control field containing control information. The frame control field specifies the frame type, for example, a data frame, a control frame, or a management frame. The MAC header 414 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each MPDU 410 may also include a frame check sequence (FCS) field 418 for error detection. For example, the FCS field 418 may include a cyclic redundancy check (CRC), and may be followed by one or more padding bits 420.

As described above, APs 102 and STAs 104 can support multi-user (MU) communications. That is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
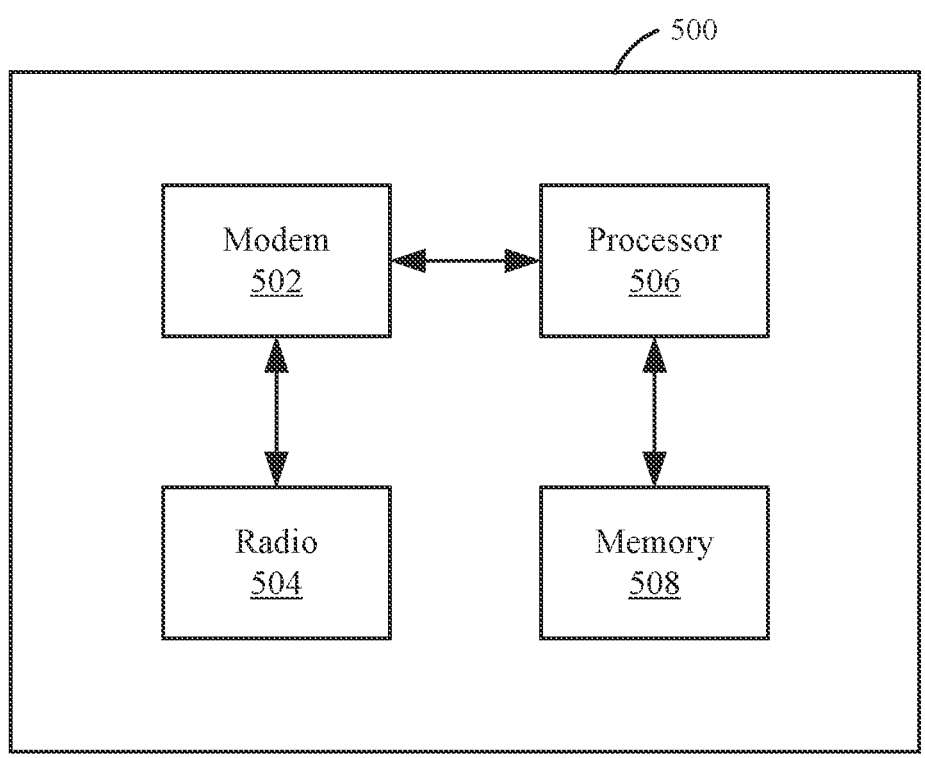
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some other implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device 500 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 500 can be, or can include, a chip, system on chip (SoC), chipset, package, or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 500 further includes one or more processors, processing blocks or processing elements 506 (collectively "the processor 506"), and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless channel. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer, and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation, or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless channel. For example, the processor 506 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 508 can include tangible storage media such as random-access memory (RAM) or read-only memory (ROM), or combinations thereof. The memory 508 also can store non-transitory processor- or computer-executable software (SW) code containing instructions that, when executed by the processor 506, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 6B:
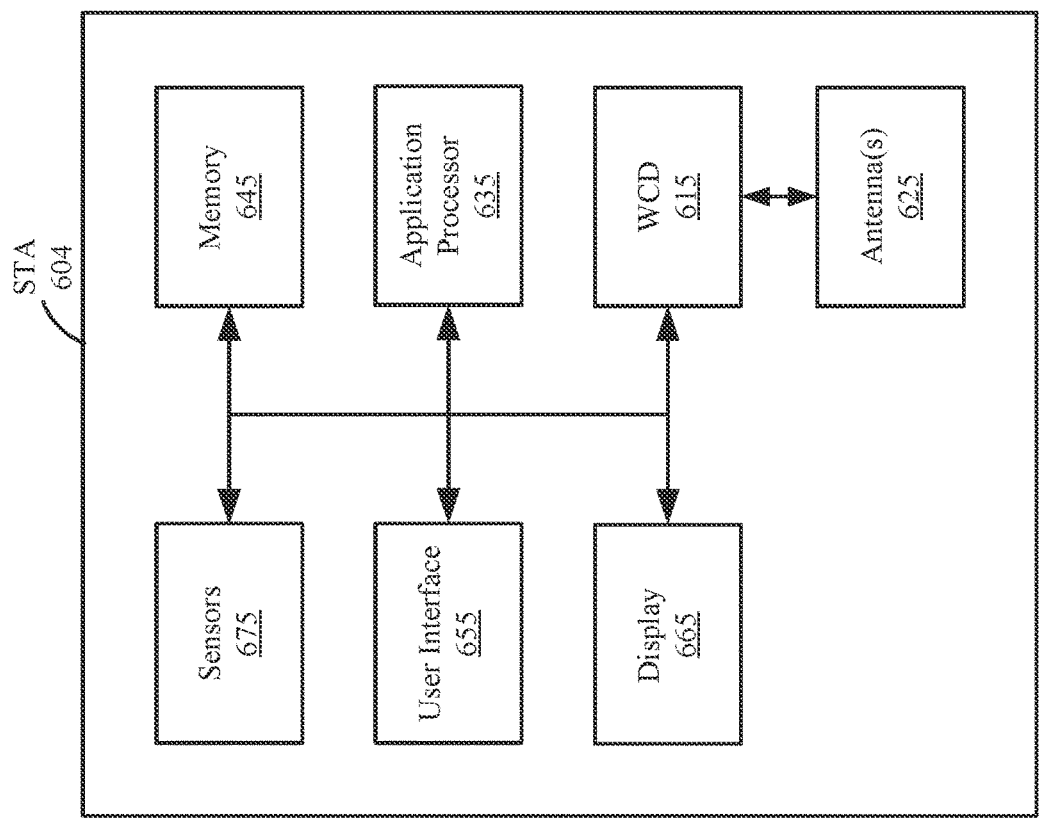
FIG. 6B shows a block diagram of an example station (STA).
Figure 6A:
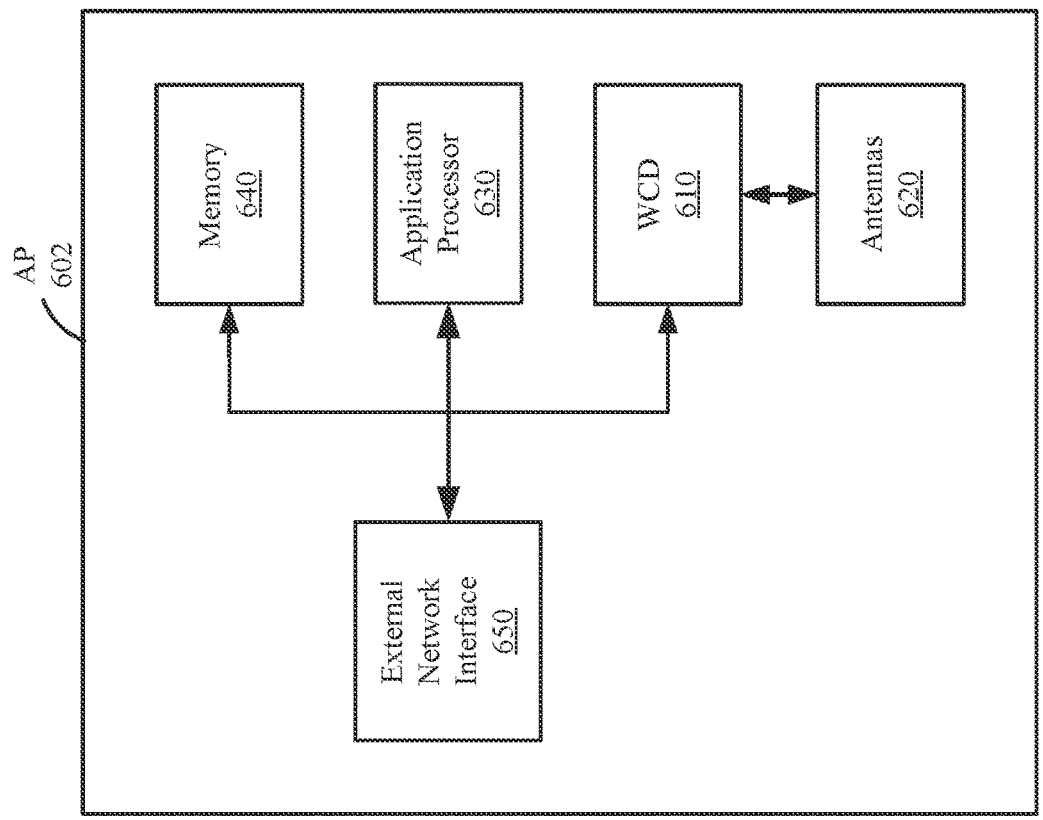
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7:
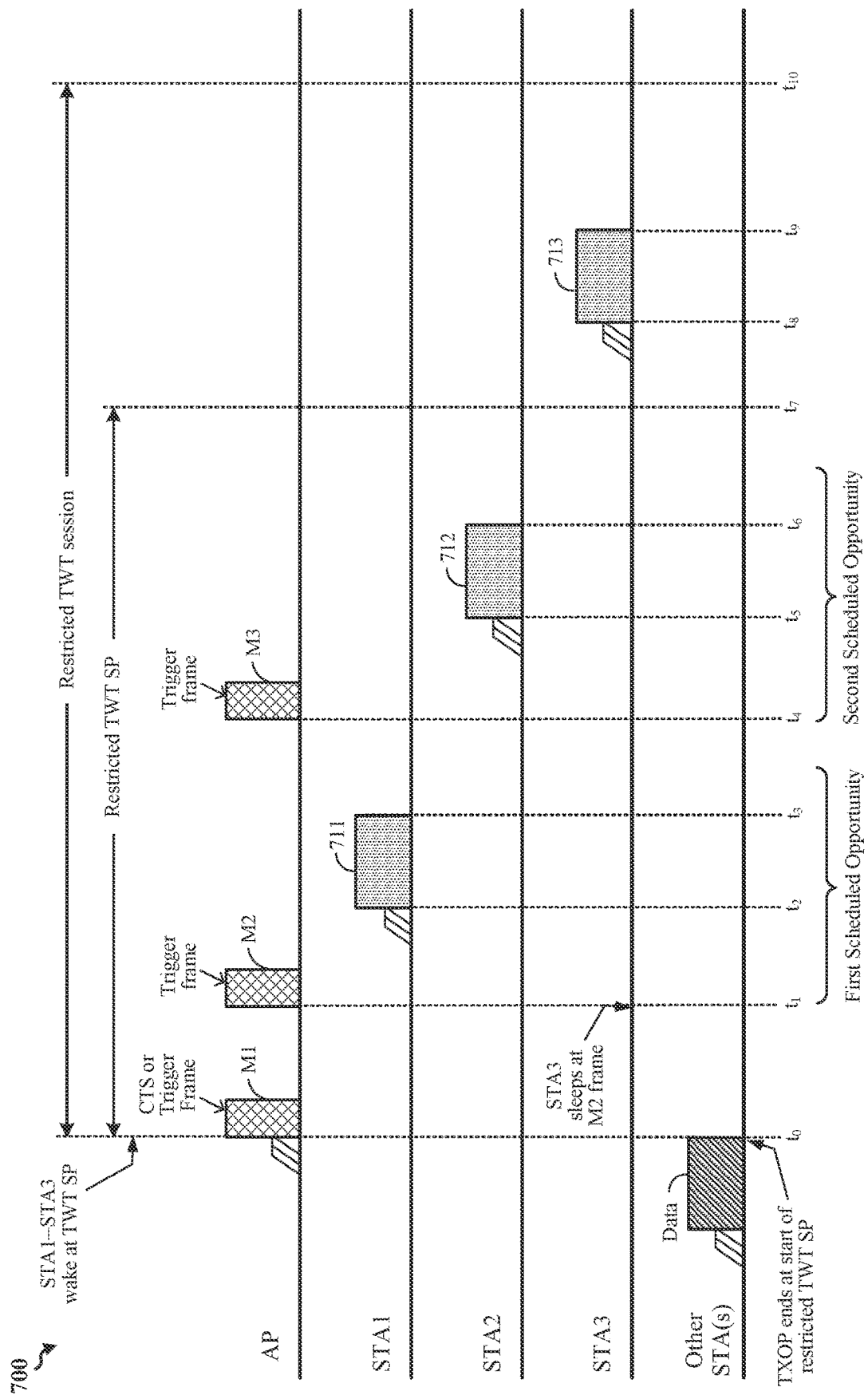
FIG. 7 shows a timing diagram depicting an example wireless communication that supports restricted target wake time (TWT) service periods according to some implementations.

FIG. 7 shows a timing diagram depicting an example wireless communication 700 that supports restricted TWT service periods according to some implementations. In the example of FIG. 7, the wireless communications 700 may be performed between an AP, three wireless stations STA1-STA3 that are associated with the AP, and one or more other STAs that are in communication range of the AP but are not associated with the AP. The AP may be one example of the APs 102 and 602 described above with reference to FIGS. 1 and 6A, respectively. Each of the wireless stations STA1, STA2, and STA3 may be one example of the STAs 104 and 604 described above with reference to FIGS. 1 and 6B, respectively. The other STAs may also be examples of the STAs 104 and 604 described above with reference to FIGS. 1 and 6B, respectively. For simplicity, the example of FIG. 7 depicts only three stations STA1-STA3 associated with the AP. In some other implementations, the AP may be associated with other numbers of STAs.

Prior to time $t_0$, the AP may establish a restricted TWT session for one or more STAs associated with low-latency or latency sensitive traffic. As discussed, low-latency or latency sensitive traffic may include traffic originating from real time applications having stringent latency requirements, small jitter margins, and specific throughput metrics. The restricted TWT session may include one or more restricted TWT SPs during which the AP reserves access to the wireless channel only for STAs that are members of the restricted TWT session (and thus belong to the restricted TWT session). The AP can use enhanced channel access protection and resource reservation mechanisms during the one or more restricted TWT SPs to provide STAs belonging to the restricted TWT session with more predictable latencies, lower worst-case latency, reduced jitter, higher throughput, and increased reliability for low-latency or latency sensitive traffic (as compared with conventional solutions).

In some implementations, the AP may select or determine a group of STAs associated with low-latency or latency sensitive traffic, and admit the group of STAs as members of the restricted TWT session. In the example of FIG. 7, each of the wireless stations STA1-STA3 is associated with low-latency or latency sensitive traffic and is a member of the restricted TWT session established by the AP. The other STAs are not associated with low-latency traffic, and are not members of the restricted TWT session.

The AP may advertise the restricted TWT session by including a TWT Element in beacon frames transmitted on the wireless channel to its associated STAs. The TWT Element may indicate the existence of the restricted TWT session, may indicate that the restricted TWT session is associated with low-latency traffic, and may indicate one or more parameters of the restricted TWT session. The one or more parameters may include (but are not limited to) a duration of the restricted TWT SPs, a duration of the restricted TWT wake interval, the operating channel associated with the restricted TWT session, and the target wake times associated with the restricted TWT session. In some aspects, the one or more parameters may also indicate whether the restricted TWT session is a broadcast TWT session or an individual TWT session, or whether the restricted TWT session is a peer-to-peer (P2P) TWT session.

In some implementations, the TWT Element may indicate that the restricted TWT session is established for low-latency traffic corresponding to one or more selected traffic identifiers (TIDs). For example, in some instances, the selected TIDs may be associated with a voice access category (AC_VO). In other instances, the selected TIDs may be associated with a video access category (AC_VI). In some other instances, the TWT Element may indicate that the restricted TWT session is established for low-latency traffic corresponding to a predefined label or belonging to a selected traffic flow. For example, in some instances, the predefined label or the selected traffic flow may be identified by an IP 5-tuple or an IPV6 flow label. In various implementations, the TWT Element may advertise or otherwise indicate one or more TIDs, labels, and/or traffic flows specified by the AP.

In the example of FIG. 7, STA1 and STA2 are associated with low-latency traffic corresponding to a first set of TIDs, labels, and/or traffic flows, and STA3 is associated with low-latency traffic corresponding to a second set of TIDs, labels, and/or traffic flows different than the first set. When a respective STA receives a beacon frame (or other suitable management frame) that carries a TWT Element indicating that the restricted TWT session is established for low-latency or latency sensitive traffic corresponding to the first set of TIDs, labels, and/or traffic flows, the respective STA may request to join or become a member of the restricted TWT session based on a match between the TIDs, labels, or traffic flows associated with the respective STA's low-latency traffic and the TIDs, labels, or traffic flows specified by the AP or advertised in the TWT Element carried in beacon frames transmitted by the AP.

Specifically, each of STA1 and STA2 may send a request to the AP indicating that the respective STA is associated with low-latency traffic corresponding to the one or more selected TIDs identified by the TWT Element. In some instances, the AP may verify that the TID(s) corresponding to the traffic flows of each of STA1 and STA2 match the selected TIDs identified by the TWT Element before admitting STA1 and STA2 as members of the restricted TWT session.

In some instances, the TWT Element may also include an indication that wireless communication devices not identified by the TWT Element are to end their respective TXOPs and terminate any associated transmissions on the wireless channel at or before the start of each restricted TWT SP. For example, the other STAs depicted in FIG. 7 may terminate their TXOPs and end any associated UL transmissions on the wireless channel at time $t_0$, which corresponds to the start of a first restricted TWT SP of the restricted TWT session. In some aspects, the indication may be carried in the TWT Parameter Information field of the TWT Element included in beacon frames, probe responses, association responses, reassociation responses, or other suitable management frames transmitted by the AP.

Prior to time $t_0$, each of STA1-STA3 wakes from a power-save mode or sleep state to listen for beacon frames and other management frames transmitted on the wireless channel by the AP. Also prior to time $t_0$, the AP contends for channel access using a suitable channel access mechanism (such as the EDCA mechanism), and obtains a TXOP on the wireless channel for at least a portion of the restricted TWT session.

At time $t_0$, the AP transmits a first frame M1 on the wireless channel. The first frame M1 identifies, from the group of STAs belonging to the restricted TWT session, one or more STAs that are permitted to contend for channel access during at least a first portion of the restricted TWT SP. In some instances, the first frame M1 may indicate that wireless communication devices not identified by the first frame M1 are to refrain from contending for channel access for a specified period of time after detecting or receiving the first frame M1. Examples of the specified period of time may include (but are not limited to) the first portion of the restricted TWT SP, the duration of the restricted TWT SP, the duration of the TXOP obtained by the AP, or some other time period. In some other instances, the first frame M1 may also indicate that wireless communication devices not identified by the first frame M1 are to enter a power-save mode based on reception of the first frame M1.

In some implementations, the first frame M1 may be a CTS frame. In some instances, the AP may set the receiver address (RA) of the CTS frame to a configured MAC address that indicates the specified time period. Wireless communication devices that receive the CTS frame may decode the configured MAC address, determine the time period specified by or associated with the configured MAC address, and set their respective NAVs to the specified time period. In some aspects, setting the RA of the CTS frame to the configured MAC address may also indicate that STA1 and STA2 may ignore the CTS frame, and thus may not set their respective NAVs.

In other implementations, the first frame M1 may be an MU-RTS trigger frame including the association identifier (AID) of each identified STA. The MU-RTS trigger frame may also indicate a time period to which wireless communication devices not identified by the MU-RTS trigger frame are to set their respective NAVs. In some instances, the MU-RTS trigger frame may allocate, to the one or more identified STAs, time and frequency resources that can be used for uplink transmissions, downlink transmissions, or both. Although not shown in FIG. 7 for simplicity, each of STA1 and STA2 may transmit a frame (such as a CTS frame or an ACK frame) to acknowledge receipt of the MU-RTS trigger frame.

In some other implementations, the first frame M1 may be a BSRP trigger frame that carries a reserved bit or field set to a configured value. The BSRP trigger frame may include the AID values of the one or more identified STAs, and may solicit a report of queued uplink (UL) data or queued P2P data from each of the one or more identified STAs.

For the example of FIG. 7, STA1 and STA2 are identified by the first frame M1, and STA3 is not identified by the first frame M1. As such, STA1 and STA2 may contend with each other for channel access during at least a portion of the TXOP obtained by the AP. STA3 is not identified by the first frame M1, and does not contend for channel access during the TXOP obtained by the AP. As such, STA3 may return to a power-save mode or a sleep state at or before time $t_1$.

At time $t_1$, the AP transmits, on the wireless channel, a second frame M2 that identifies one or more STAs of the group of STAs belonging to the restricted TWT session that are permitted to transmit or receive data over the wireless channel during a first scheduled opportunity of the restricted TWT SP. Specifically, the second frame M2 may select one or more of the STAs identified by the first frame M1 to receive DL data or to transmit UL data (or both) over the wireless channel during the first scheduled opportunity of the restricted TWT SP. In the example of FIG. 7, the second frame M2 selects or identifies STA1, and thus STA1 may be permitted to contend for channel access and thereafter transmit or receive data on the wireless channel during the first scheduled opportunity. In instances for which STA1 is associated with P2P communications, the second frame M2 may carry instructions for STA1 to indicate a time at which the transmission or reception of P2P communications is to end.

Although STA2 and STA3 are associated with low-latency or latency sensitive traffic and are members of the restricted TWT session, the omission of STA2 and STA3 from the second frame M2 may preclude each of STA2 and STA3 from attempting to obtain channel access during the first scheduled opportunity. In some instances, the second frame M2 may be a trigger frame such as an MU-RTS trigger frame, a BSRP trigger frame, or a PS-Poll frame. In other instances, the second frame M2 may be a CTS frame. In some implementations, the spacing in time between transmissions of the first frame M1 and the second frame M2 may be at least an arbitration inter-frame space (AIFS).

At time $t_2$, STA1 transmits or receives one or more first PPDUs 711 over the wireless channel based at least in part on the second frame M2. In some instances, STA1 may transmit the one or more first PPDUs 711 as UL PPDUs to other wireless communication devices between times $t_2$ and $t_3$. In other instances, STA1 may receive the one or more first PPDUs 711 as DL PPDUs from other wireless communication devices between times $t_2$ and $t_3$. In some other instances, STA1 may transmit one or more UL PPDUs concurrently with receiving one or more DL PPDUs on the wireless channel between times $t_2$ and $t_3$.

The AP may be configured to monitor the wireless channel, continuously or periodically, for a presence or an absence of data transmissions on the wireless channel for a period of time after transmission of the second frame M2. In this way, the AP may ensure that the wireless channel is being utilized during the first scheduled opportunity. The period of time may be indicated in the second frame M2. In some instances, the period of time may be an arbitration inter-frame space (AIFS) duration plus a minimum contention window size ($CW_{min}$). In other instances, the period of time may be a point coordination function (PCF) interframe space (PIFS) duration. In some other instances, the period of time may be any suitable variation of the IFS duration. If the AP does not detect any data transmissions from STA1 on the wireless channel within the period the time (which may indicate that the second frame M2 was not received by STA1 or that STA1 is not able to transmit data), the AP may retransmit the second frame M2 to STA1, and may also transmit a third frame M3 to STA2 as a failure recovery operation (not shown for simplicity).

In the example of FIG. 7, STA1 completes the transmission or reception of the one or more PPDUs 711 at or before time $t_3$. Then, between times $t_3$ and $t_4$, the AP may release the wireless channel from STA1 based on a transmit duration of the one or more PPDUs 711 and any acknowledgement (ACK) frames that may follow the communication of the one or more PPDUs 711. For simplicity, the ACK frames are not shown in the example of FIG. 7. In some instances, the end of the communication of the one or more PPDUs 711 on the wireless channel may be detected based on one or more indications carried in the packet preambles of the PPDUs 711.

At time $t_4$, the AP transmits, on the wireless channel, a third frame M3 identifying one or more STAs of the group of STAs belonging to the restricted TWT session that are permitted to transmit or receive data over the wireless channel during a second scheduled opportunity of the restricted TWT SP. Specifically, the third frame M3 may select one or more of the STAs identified by the first frame M1 to receive DL data or to transmit UL data (or both) over the wireless channel during the second scheduled opportunity. In the example of FIG. 7, the third frame M3 identifies STA2 for the second scheduled opportunity, and thus STA2 may be permitted to contend for channel access and thereafter transmit or receive data on the wireless channel during the second scheduled opportunity. As shown, STA2 accesses the wireless channel at or before time $t_5$.

At time $t_5$, STA2 transmits or receives one or more second PPDUs 712 on the wireless channel based at least in part on the third frame M3. In some instances, STA2 may transmit the one or more second PPDUs 712 as UL PPDUs to other wireless communication devices between times $t_5$ and $t_6$. In other instances, STA2 may receive the one or more second PPDUs 712 as DL PPDUs from other wireless communication devices between times $t_5$ and $t_6$. In some other instances, STA2 may transmit one or more UL PPDUs concurrently with receiving one or more DL PPDUs on the wireless channel between times $t_5$ and $t_6$.

At time $t_7$, the restricted TWT SP ends, and STA3 may access the wireless channel. In some instances, STA3 may use a contention-based channel access mechanism (such as an EDCA mechanism) to gain access to the wireless channel. In the example of FIG. 7, STA3 gains access to the wireless channel at time $t_8$, and transmits one or more UL PPDUs 713 on the wireless channel to the AP between times $t_8$ and $t_9$. At time $t_{10}$, the restricted TWT session ends.

Figure 8:
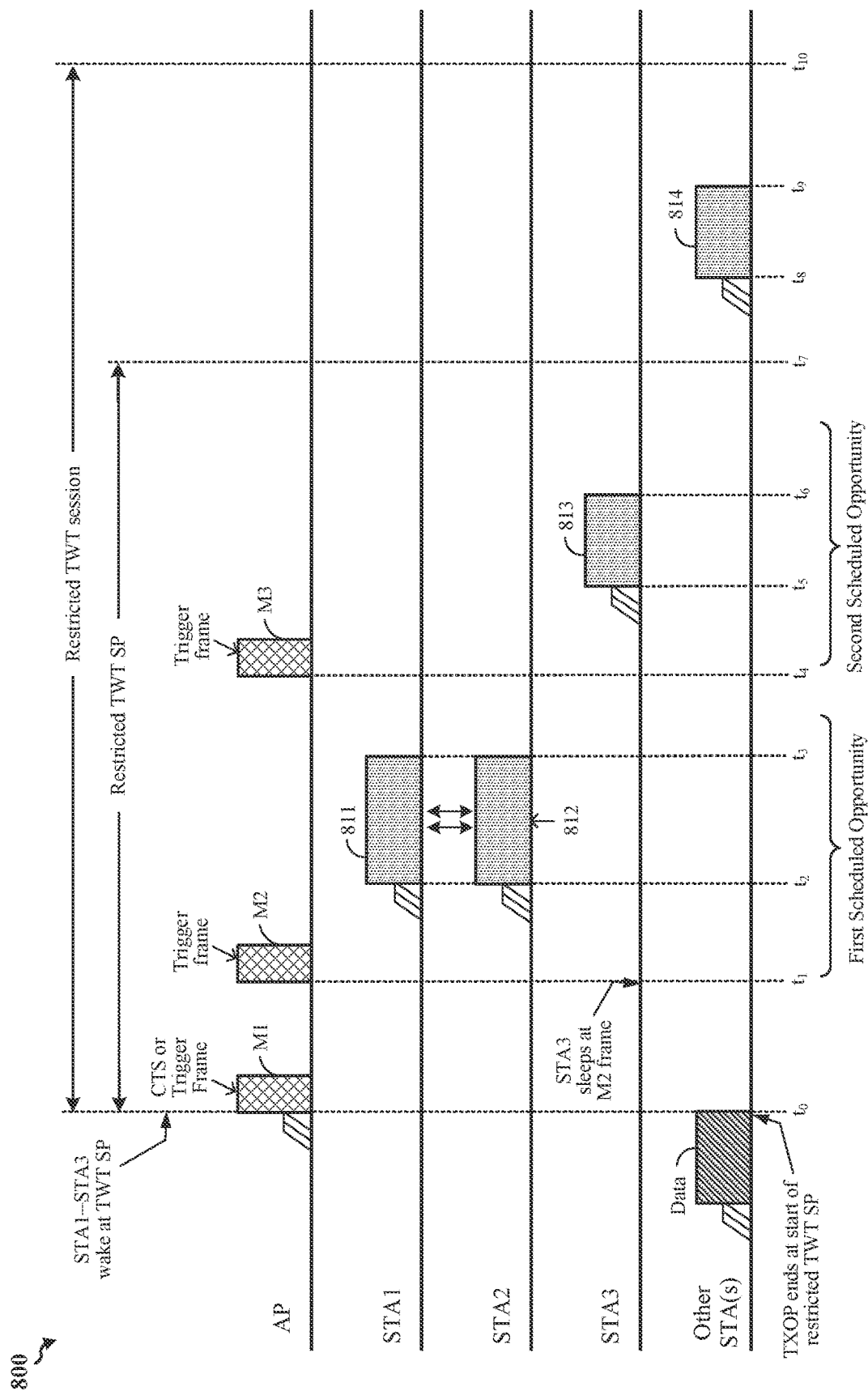
FIG. 8 shows a timing diagram depicting another example wireless communication that supports restricted TWT service periods according to some implementations.

FIG. 8 shows a timing diagram depicting another example wireless communication 800 that supports restricted TWT service periods according to some implementations. In the example of FIG. 8, the wireless communications 800 may be performed between the AP and STAs described with reference to FIG. 7. The timing diagram of FIG. 8 is similar to the timing diagram of FIG. 7, except that in the example of FIG. 8, the AP determines that each of STA1 and STA2 is associated with a P2P link. In some aspects, the AP may classify STA1 and STA2 as P2P STAs based on their association with the P2P link.

Prior to time $t_0$, the AP may establish a restricted TWT session for one or more STAs associated with P2P traffic. The restricted TWT session may include one or more restricted TWT SPs during which the AP reserves access to the wireless channel only for STAs that are members of the restricted TWT session. The AP can use enhanced channel access protection and resource reservation mechanisms during the one or more restricted TWT SPs to provide more predictable latencies, reduced worst case latency, reduced jitter, and increased reliability for P2P communications. In some implementations, the AP may admit one or more STAs (such as STA1 and STA2) that are associated with a P2P link or are classified as P2P devices as members of the restricted TWT session. In the example of FIG. 8, each of STA1 and STA2 is associated with a P2P link and is a member of the restricted TWT session established or scheduled by the AP. STA3 and the other STAs are not associated with a P2P link or classified as P2P devices, and are not members of the restricted TWT session.

At time $t_0$, the AP transmits, on the wireless channel, a first frame M1 identifying one or more STAs of the group of STAs belonging to the restricted TWT session that are permitted to contend for channel access during a first scheduled opportunity of the restricted TWT session. The first frame M1 may also indicate that wireless communication devices not identified by the first frame M1 are to refrain from contending for channel access during the TXOP (or during the restricted TWT SP). In some other instances, the first frame M1 may indicate that wireless communication devices not identified by the first frame M1 are to enter a power-save mode based on reception of the first frame M1. The first frame M1 may be a CTS frame, an MU-RTS trigger frame, a BSRP trigger frame, or any other frame that can identify one or more STAs and solicit UL data from the identified STAs. In the example of FIG. 8, the first frame M1 identifies STA1 and STA2, and thus STA1 and STA2 are permitted to contend for channel access during at least the first scheduled opportunity of the restricted TWT session.

At time $t_1$, the AP transmits, on the wireless channel, a second frame M2 that selects or indicates one or more members of the restricted TWT session. The spacing in time between transmissions of the first frame M1 and the second frame M2 may be one or more suitable variants of the IFS duration. Specifically, the second frame M2 may select one or more of the STAs identified by the first frame M1 to receive DL data or to transmit UL data (or both) on the wireless channel during the first scheduled opportunity. In the example of FIG. 8, the second frame M2 selects or identifies STA1 and STA2, and thus STA1 and STA2 may be permitted to contend for channel access and thereafter transmit or receive data on the wireless channel during the first scheduled opportunity.

As discussed, the second frame M2 may be a trigger frame that can allocate time or frequency resources to the STAs identified by the second frame M2. The second frame M2 may also carry instructions for each of STA1 and STA2 to indicate a time at which the P2P communications is to end. In some instances, the indication may be carried in a signal field of a preamble of a last PPDU transmitted from STA1 or STA2.

As shown, STA1 and STA2 exchange P2P communications 811 and 812 between times $t_2$ and $t_3$. As discussed, the AP may be configured to monitor the wireless channel, continuously or periodically, for a presence or an absence of data for a period of time after transmission of the second frame M2. This may ensure that the wireless channel is being utilized during the first scheduled opportunity of the restricted TWT SP. The period of time may be indicated in the second frame M2. For the example of FIG. 8, STA1 and STA2 complete the P2P transmissions 811 and 812 at time $t_3$. In some instances, the AP may detect an absence of data on the wireless channel after the P2P transmissions end at time $t_3$. Then, between times $t_3$ and $t_4$, the AP releases the wireless channel from STA1 and STA2 based on the absence of data on the wireless channel between times $t_3$ and $t_4$.

At time $t_4$, the AP transmits, on the wireless channel, a third frame M3 that selects or identifies one or more STAs of the group of STAs belonging to the restricted TWT session that are permitted to transmit or receive data on the wireless channel during a second scheduled opportunity of the restricted TWT SP. Specifically, the third frame M3 may select one or more of the STAs identified by the first frame M1 to receive DL data or to transmit UL data (or both) on the wireless channel during the second scheduled opportunity. In the example of FIG. 8, the third frame M3 selects or identifies STA3, and thus STA3 may be permitted to contend for channel access and thereafter transmit or receive data on the wireless channel during the second scheduled opportunity of the restricted TWT SP. As shown, STA3 accesses the wireless channel at or before time $t_5$, and may transmit one or more UL PPDUs 813 on the wireless channel between times $t_5$ and $t_6$.

At time $t_7$, the restricted TWT SP ends. In some instances, the AP may not have any queued downlink data for any of STA1-STA3, and none of STA1-STA3 may have queued uplink data for transmission to the AP. In some instances, the AP may permit one or more of the other STAs to access the wireless channel, for example, and transmit data to or receive data from other wireless communication devices. In the example of FIG. 8, the other STA gains access to the wireless channel at time $t_8$, and transmits or receives one or more PPDUs 814 on the wireless channel between times $t_8$ and $t_9$. At time $t_{10}$, the restricted TWT session ends.

Figure 9:
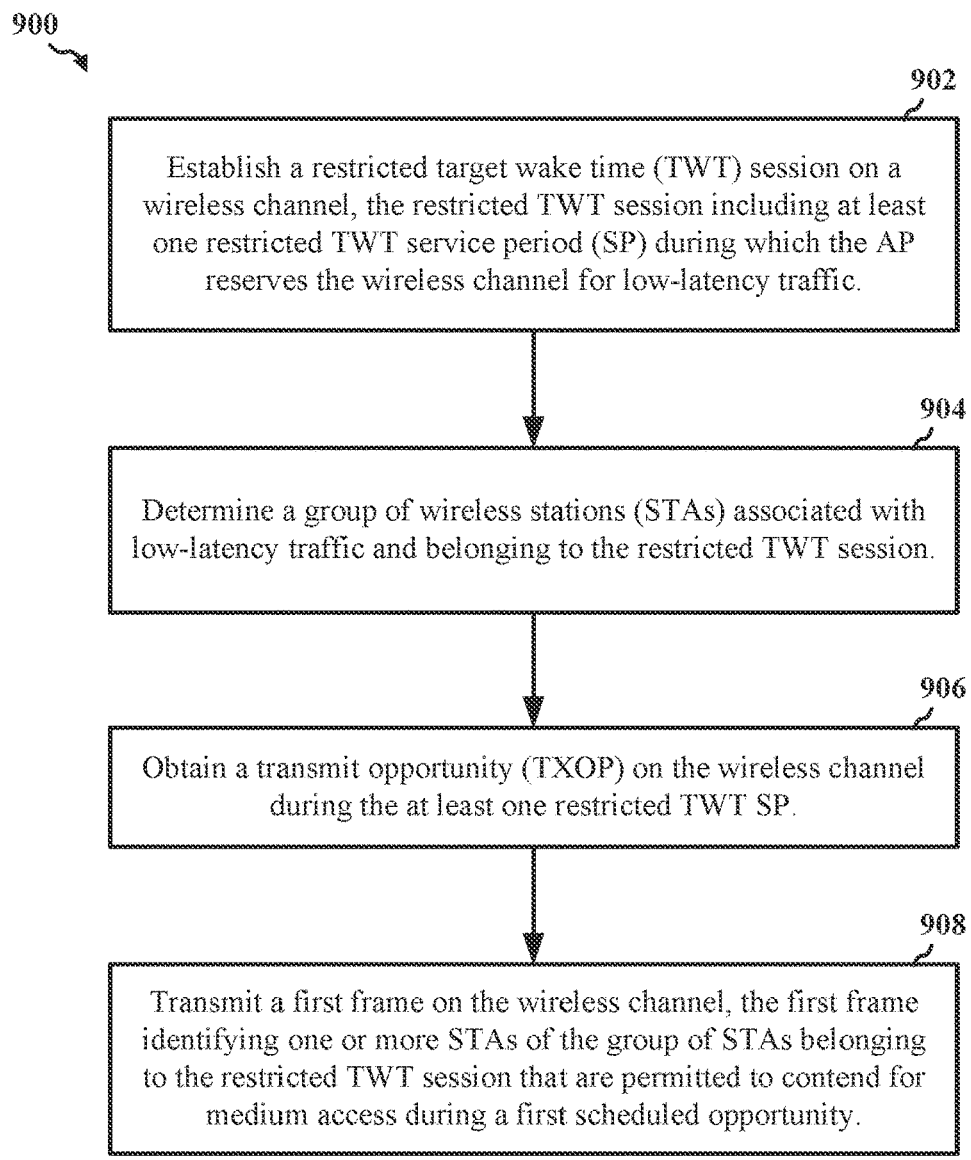
FIGS. 9-16 show flowcharts illustrating example processes for wireless communication that support restricted TWT service periods for low-latency or latency sensitive traffic according to some implementations.

FIG. 9 shows a flowchart illustrating an example process 900 for wireless communication that supports restricted TWT service periods for low-latency or latency sensitive traffic according to some implementations. The process 900 may be performed by a wireless communication device such as the wireless communication device 500 described with reference to FIG. 5. In some implementations, the process 900 may be performed by a wireless communication device operating as or within an AP, such as one of the APs 102 and 602 described with reference to FIGS. 1 and 6A, respectively.

For example, at block 902, the AP establishes a restricted target wake time (TWT) session on a wireless channel. The restricted TWT session includes at least one restricted TWT service period (SP) during which the AP reserves the wireless channel for low-latency or latency sensitive traffic. At block 904, the AP determines a group of wireless stations (STAs) associated with low-latency or latency sensitive traffic that belong to the established TWT session. At block 906, the AP obtains a transmission opportunity (TXOP) on the wireless channel during the at least one restricted TWT SP. At block 908, the AP transmits a first frame on the wireless channel, the first frame identifying one or more STAs of the group of STAs belonging to the restricted TWT session that are permitted to contend for channel access during a first scheduled opportunity of the restricted TWT SP.

In some implementations, the one or more identified STAs includes less than all of the STAs in the group of STAs that belong to the restricted TWT session. That is, in some instances, the first frame may identify or select a subset of the members of the restricted TWT session that can access the wireless channel during the restricted TWT SP. In this way, the AP may limit the number of STAs contending for channel access during a given period of time, thereby increasing the likelihood that the STAs identified by the first frame obtain a TXOP on the wireless channel.

In some implementations, the first frame indicates that the wireless channel is busy or unavailable to wireless communication devices not identified by the first frame. In addition, or in the alternative, the first frame may indicate that wireless communication devices not identified by the first frame are to refrain from contending for channel access during at least the first scheduled opportunity.

The first frame may also indicate that wireless communication devices not identified by the first frame are to enter a power-save mode after reception of the first frame. In some instances, the first frame may indicate a period of time during which wireless communication devices not identified by the first frame are to remain in the power save mode. In some other instances, the first frame may indicate, for each STA of the group of STAs belonging to the restricted TWT session and not identified by the first frame, a channel access schedule for a portion of the restricted TWT SP occurring after the TXOP. The channel access schedule may cover any suitable time period. In some aspects, the channel access schedule spans one or more distinct TXOPs within the restricted TWT SP.

In some other implementations, the first frame may be a CTS frame indicating a time period to which wireless communication devices other than the one or more identified STAs are to set their respective network allocation vectors (NAVs). The time period may correspond to a duration of the TXOP, to a duration of the first scheduled opportunity, or to some other suitable time period. In instances for which only one STA is identified by the first frame, a receiver address (RA) of the CTS frame is set to a MAC address of the one STA. In some other instances, the RA of the CTS frame may be set to a configured MAC address indicating that STAs belonging to the restricted TWT session are permitted to contend for channel access during the first scheduled opportunity.

In some other implementations, the first frame may be a trigger frame including an AID value of each STA identified by the trigger frame. The trigger frame may allocate frequency resources to the STAs identified by the trigger frame for transmitting or receiving wireless signals over the wireless channel during the first scheduled opportunity. The trigger frame may also indicate a time period to which wireless communication devices not identified by the trigger frame are to set their respective NAVs. The time period may correspond to a duration of the TXOP, to a duration of the first scheduled opportunity, or to some other suitable time period. In some instances, the time period may be carried or indicated in a duration/ID field of the trigger frame. In some other instances, the indicated time period may be carried or indicated in a signal field of a preamble of the trigger frame.

In some instances, the trigger frame may be an MU-RTS trigger frame including a reserved bit or field set to a configured value. Each STA that receives the MU-RTS trigger frame may transmit a CTS frame to acknowledge receipt of the MU-RTS trigger frame. In some aspects, the CTS frames transmitted by STAs identified in the MU-RTS trigger frame may be used to prevent other wireless communication devices from accessing the wireless channel during the indicated time period. For example, a CTS frame may indicate a time period during which wireless communication devices not identified by the MU-RTS trigger frame are to refrain from contending for channel access. In some aspects, a respective STA may transmit the CTS frame as a plurality of non-HT PPDU duplicates on a plurality of respective 20 MHz channels or frequency sub-bands, for example, to keep other wireless communication devices from accessing the wireless channel.

In some other instances, the trigger frame may be a BSRP trigger frame including a reserved bit or field set to a configured value. The BSRP trigger frame may solicit a report of queued uplink (UL) data or queued P2P data from each STA identified by the trigger frame. Each STA that receives the BSRP trigger frame may transmit a CTS frame to acknowledge receipt of the BSRP trigger frame. In some instances, a respective STA may transmit a buffer status report (BSR) indicating an amount of queued UL data or an amount of queued P2P data in response to receiving the BSRP trigger frame. The AP may receive the BSRs from each of the identified STAs, and may determine the amount of queued data each STA has relative to the other STAs. In some aspects, the AP may use information contained in the received BSRs to determine a channel access schedule for the STAs.

Figure 10:
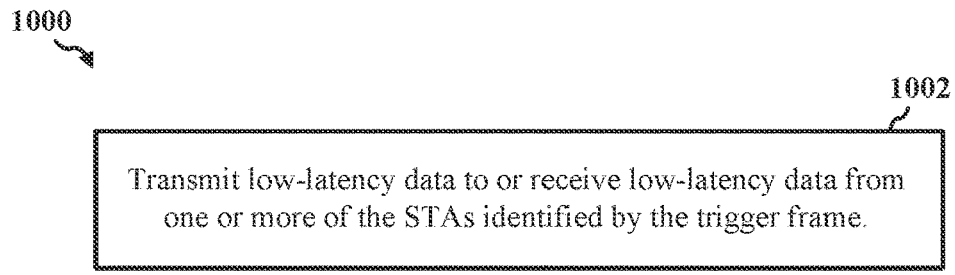

FIG. 10 shows a flowchart illustrating another example process 1000 for wireless communication that supports restricted TWT service periods for low-latency or latency sensitive traffic according to some implementations. The process 1000 may be performed by a wireless communication device such as the wireless communication device 500 described with reference to FIG. 5. In some implementations, the process 1000 may be performed by a wireless communication device operating as or within an AP, such as one of the APs 102 and 602 described with reference to FIGS. 1 and 6A, respectively. In some instances, the process 1000 may be performed after transmitting the first frame on the wireless channel in block 908 of FIG. 9. For example, at block 1002, the AP transmits or receives low-latency or latency sensitive data to or from one or more of the STAs identified by the trigger frame during the first scheduled opportunity.

Figure 11:
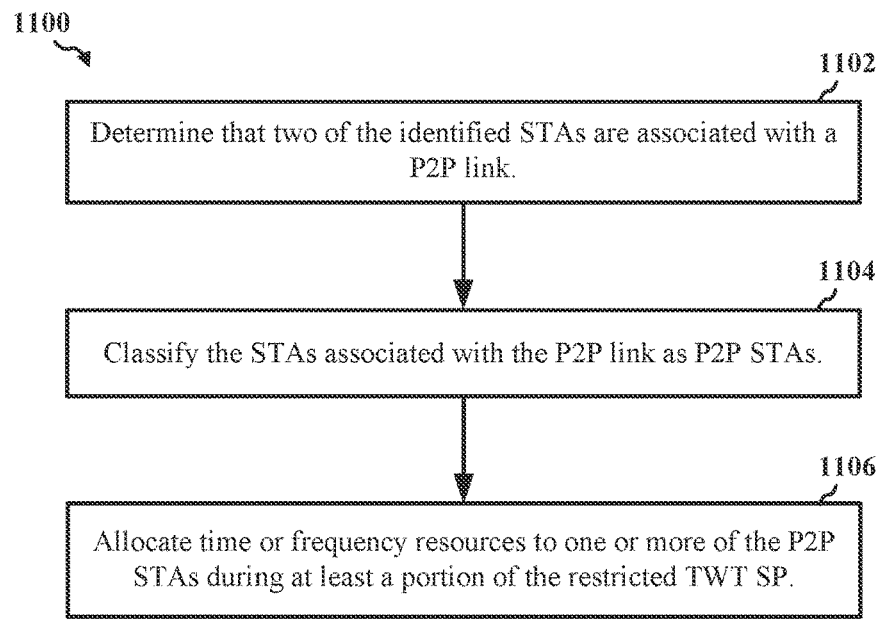

FIG. 11 shows a flowchart illustrating another example process 1100 for wireless communication that supports restricted TWT service periods for low-latency or latency sensitive traffic according to some implementations. The process 1100 may be performed by a wireless communication device such as the wireless communication device 500 described with reference to FIG. 5. In some implementations, the process 1100 may be performed by a wireless communication device operating as or within an AP, such as one of the APs 102 and 602 described with reference to FIGS. 1 and 6A, respectively. In some instances, the process 1100 may be performed after transmitting the first frame over the wireless channel in block 908 of FIG. 9.

For example, at block 1102, the AP determines that two of the STAs identified by the trigger frame are associated with a P2P link. At block 1104, the AP classifies the STAs associated with the P2P link as P2P STAs. At block 1106, the AP allocates time or frequency resources to one or more of the P2P STAs during at least a portion of the restricted TWT SP. In some implementations, the P2P STAs may be tunneled direct-link setup (TDLS) peer STAs or Wi-Fi Peer-to-Peer STAs. In some instances, the AP can estimate a duration of a P2P transmission between the two P2P STAs. In some other instances, each P2P STA may indicate an end of a corresponding P2P transmission by providing a predefined signal, flag, or bit in the P2P transmission.

Figure 12:
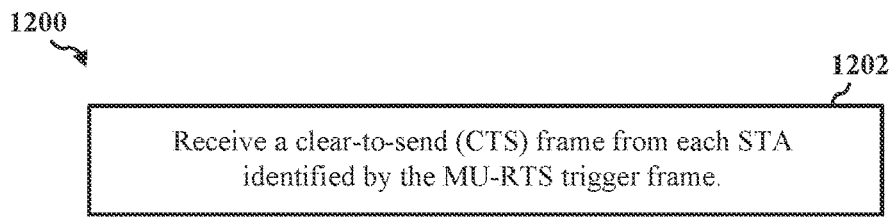

FIG. 12 shows a flowchart illustrating another example process 1200 for wireless communication that supports restricted TWT service periods for low-latency or latency sensitive traffic according to some implementations. The process 1200 may be performed by a wireless communication device such as the wireless communication device 500 described with reference to FIG. 5. In some implementations, the process 1200 may be performed by a wireless communication device operating as or within an AP, such as one of the APs 102 and 602 described with reference to FIGS. 1 and 6A, respectively. In some instances, the process 1200 may be performed after transmitting the first frame over the wireless channel in block 908 of FIG. 9.

For example, when the AP transmits an MU-RTS trigger frame to solicit UL transmissions from one or more identified STAs, each of the identified STAs may acknowledge receipt of the MU-RTS frame by sending a CTS frame to the AP. At block 1202, the AP receives a CTS frame from each STA identified by the MU-RTS trigger frame.

Figure 13:
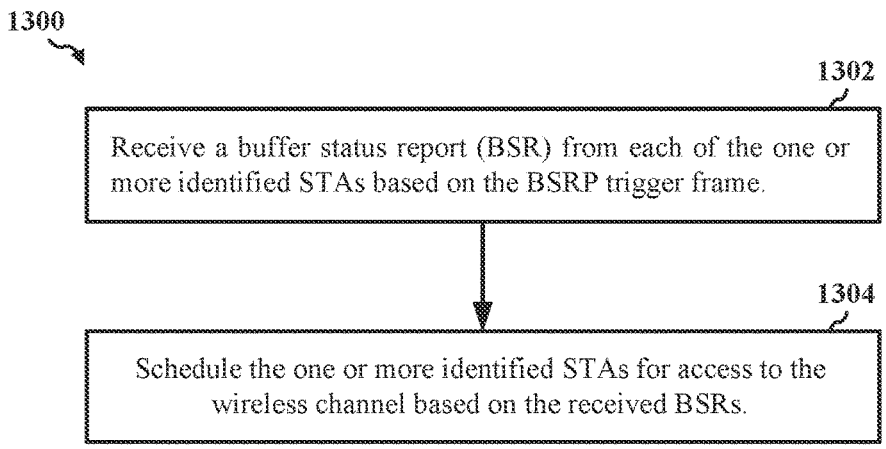

FIG. 13 shows a flowchart illustrating another example process 1300 for wireless communication that supports restricted TWT service periods for low-latency or latency sensitive traffic according to some implementations. The process 1300 may be performed by a wireless communication device such as the wireless communication device 500 described with reference to FIG. 5. In some implementations, the process 1300 may be performed by a wireless communication device operating as or within an AP, such as one of the APs 102 and 602 described with reference to FIGS. 1 and 6A, respectively. In some instances, the process 1300 may be performed after transmitting the first frame over the wireless channel as a BSRP trigger frame in block 908 of FIG. 9.

For example, at block 1302, the AP receives a buffer status report (BSR) from each of the one or more identified STAs based on the BSRP trigger frame. At block 1304, the AP schedules the one or more identified STAs for access to the wireless channel based on the received BSRs. The BSR may indicate an amount of data queued for transmission in a respective STA. The queued data may include queued UL data to be transmitted to the AP, or may correspond to a P2P transmission.

Figure 14:
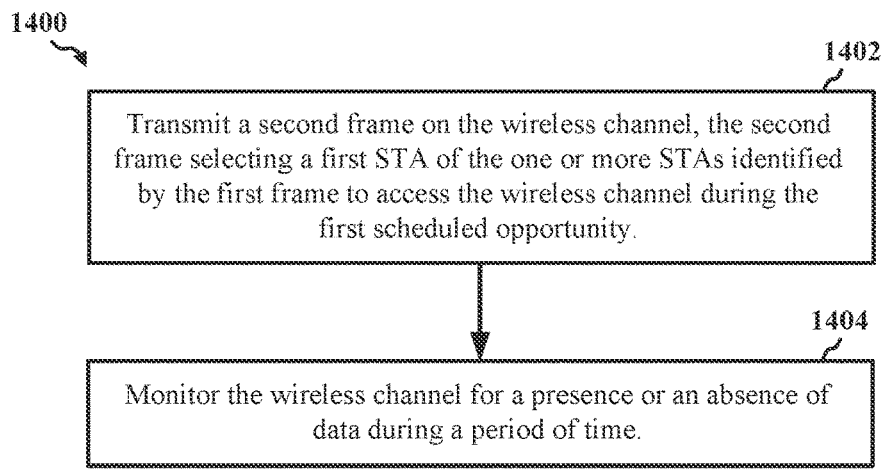

FIG. 14 shows a flowchart illustrating another example process 1400 for wireless communication that supports restricted TWT service periods for low-latency or latency sensitive traffic according to some implementations. The process 1400 may be performed by a wireless communication device such as the wireless communication device 500 described with reference to FIG. 5. In some implementations, the process 1400 may be performed by a wireless communication device operating as or within an AP, such as one of the APs 102 and 602 described with reference to FIGS. 1 and 6A, respectively. In some instances, the process 1400 may be performed after transmitting the first frame over the wireless channel as a BSRP trigger frame in block 908 of FIG. 9.

For example, at block 1402, the AP transmits a second frame on the wireless channel, the second frame selecting a first STA of the one or more STAs identified by the first frame to access the wireless channel during the first scheduled opportunity. At block 1404, the AP monitors the wireless channel for a presence or an absence of data during a period of time. In some implementations, the first frame indicates that the selected STA is to contend for channel access after receiving the second frame. In some other implementations, the trigger frame may include a time window within which the selected STA is to transmit or receive low-latency data.

Figure 15:
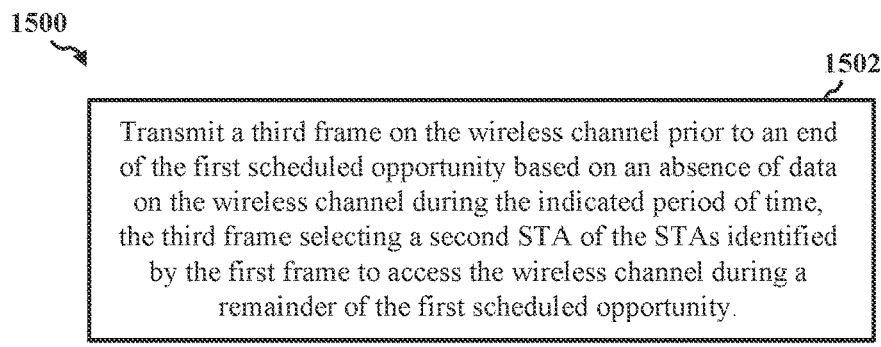

FIG. 15 shows a flowchart illustrating another example process 1500 for wireless communication that supports restricted TWT service periods for low-latency or latency sensitive traffic according to some implementations. The process 1500 may be performed by a wireless communication device such as the wireless communication device 500 described with reference to FIG. 5. In some implementations, the process 1500 may be performed by a wireless communication device operating as or within an AP, such as one of the APs 102 and 602 described with reference to FIGS. 1 and 6A, respectively. In some instances, the process 1500 may be performed after monitoring the wireless channel in block 1404 of FIG. 14.

For example, at block 1502, the AP transmits a third frame on the wireless channel prior to an end of the first scheduled opportunity based on an absence of data on the wireless channel during the indicated period of time, the third frame selecting a second STA of the STAs identified by the first frame to access the wireless channel during a remainder of the first scheduled opportunity. The second STA may contend for channel access and gain access to the wireless channel or medium during the remainder of the first scheduled opportunity.

Figure 16:
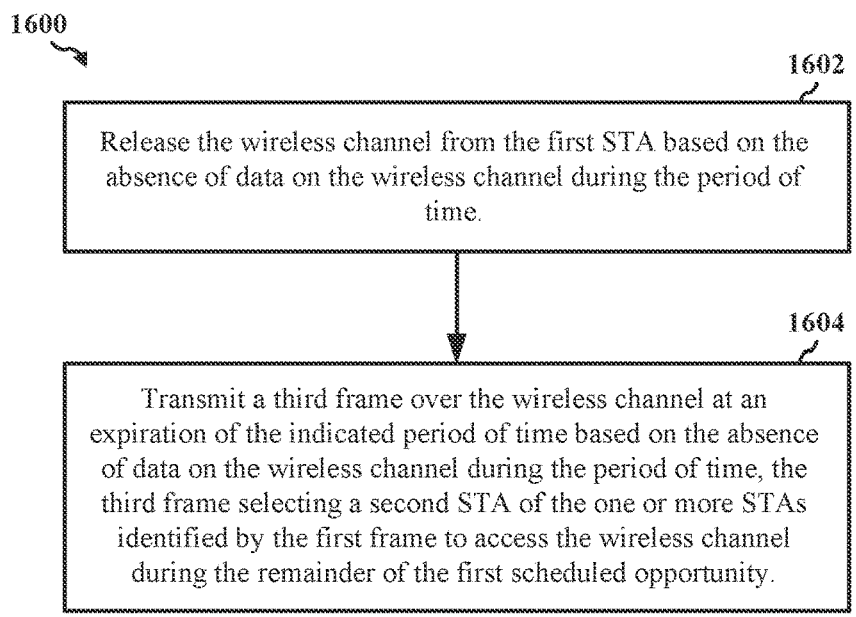

FIG. 16 shows a flowchart illustrating another example process 1600 for wireless communication that supports restricted TWT service periods for low-latency or latency sensitive traffic according to some implementations. The process 1600 may be performed by a wireless communication device such as the wireless communication device 500 described with reference to FIG. 5. In some implementations, the process 1600 may be performed by a wireless communication device operating as or within an AP, such as one of the APs 102 and 602 described with reference to FIGS. 1 and 6A, respectively. In some instances, the process 1600 may be performed after monitoring the wireless channel in block 1404 of FIG. 14. For example, at block 1602, the AP releases the wireless channel from the first STA based on the absence of data on the wireless channel during the period of time. At block 1604, the AP transmits a third frame over the wireless channel at an expiration of the indicated period of time based on the absence of data on the wireless channel during the period of time. In some instances, the third frame may select a second STA of the one or more STAs identified by the first frame to access the wireless channel during the remainder of the first scheduled opportunity.

FIG. 17A shows an example structure of a TWT Element 1700 usable for wireless communications according to some implementations. The TWT Element 1700 may include an element ID field 1702, a length field 1704, a control field 1706, and a TWT parameter information field 1708. The element ID field 1702 indicates that the element is a TWT Element. The length field 1704 indicates a length of the TWT Element 1700. The control field 1706 includes various control information for a restricted TWT session advertised by the TWT Element 1700. The TWT parameter information field 1708 contains either a single individual TWT Parameter Set field or one or more Broadcast TWT Parameter Set fields.

FIG. 17B shows an example structure of a broadcast TWT Parameter Set field 1710 usable for wireless communications according to some implementations. In some instances, the broadcast TWT Parameter Set field 1710 may be included within the TWT Parameter Information field 1708 of FIG. 17A. The broadcast TWT Parameter Set field 1710 may include a Request Type field 1712, a Target Wake Time field 1714, a Nominal Minimum TWT Wake Duration field 1716, a TWT Wake Interval Mantissa field 1717, and a Broadcast TWT Info field 1718. The Request Type field 1712 indicates a type of TWT session requested. The Target Wake Time field 1714 carries an unsigned integer corresponding to a TSF time at which the STA requests to wake. The Nominal Minimum TWT Wake Duration field 1716 indicates the minimum amount of time that the TWT requesting STA or TWT scheduled STA is expected remain in an awake state or mode. The TWT Wake Interval Mantissa field 1717 may be set to a non-zero value a periodic TWT and a zero value for an aperiodic TWT. The Broadcast TWT Info field 1718 may include a broadcast TWT ID for a corresponding restricted TWT session, and carry information indicating the number of TBTTs during which the Broadcast TWT SPs corresponding to the broadcast TWT Parameter set are present.

FIG. 17C shows an example structure of a Request Type field 1720 of a Broadcast TWT Parameter Set field usable for wireless communications according to some implementations. In some instances, the Request Type field 1720 may be one example of the Request Type field 1712 of FIG. 17C. The Request Type field 1720 may include a TWT Request subfield 1722, a TWT setup command subfield 1724, a trigger subfield 1726, a Last Broadcast Parameter Set subfield 1728, a Flow Type subfield 1730, a Broadcast TWT Recommendation subfield 1732, a TWT Wake Interval Exponent subfield 1734, and a number of reserved bits 1736. The TWT Request subfield 1722 may carry a value indicating whether the corresponding TWT Information Element was transmitted by a scheduled STA or by a scheduling STA. The TWT Setup Command subfield 1724 may carry values that indicate the type of TWT commands carried in the TWT Information Element. The Trigger subfield 1726 may indicate whether or not the TWT SP indicated by the TWT Element 1700 includes trigger frames or frames carrying a TRS Control subfield.

The Last Broadcast Parameter Set subfield 1728 indicates whether another broadcast TWT Parameter Set follows. For example, the Last Broadcast Parameter Set subfield 1728 may be set to a value of 0 to indicate that there is another TWT Parameter set following this set, or may be set to a value of 1 to indicate that this is the last broadcast TWT Parameter set in the broadcast TWT element. The Flow Type subfield 1730 indicates the type of interaction between the TWT requesting STA or TWT scheduled STA and the TWT responding STA or TWT scheduling AP at a TWT. For example, setting the Flow Type subfield 1730 to a value of 0 indicates an announced TWT in which the TWT requesting STA or the TWT scheduled STA sends a PS-Poll or an APSD trigger frame to signal its awake state. Setting the Flow Type subfield 1730 to a value of 1 indicates an unannounced TWT in which the TWT responding STA or TWT scheduling AP will send a frame to the TWT requesting STA or TWT scheduled STA at TWT without waiting to receive a PS-Poll or an APSD trigger frame.

The Broadcast TWT Recommendation subfield 1732 contains a value that indicates recommendations on the types of frames that are transmitted by TWT scheduled STAs and scheduling AP during the broadcast TWT SP, encoded according to the Broadcast TWT Recommendation subfield 1732 for a broadcast TWT element. In some instances, the Broadcast TWT Recommendation subfield 1732 may indicate whether the restricted TWT session is a peer-to-peer TWT session or a broadcast TWT session. The TWT Wake Interval Exponent subfield 1734 carries a value from which the TWT wake interval can be obtained. In some instances, the TWT Wake Interval Exponent subfield 1734 is set to the value of the exponent of the TWT Wake Interval value in microseconds, base 2.

FIG. 18 shows an example trigger frame 1800. The trigger frame 1800 may be used as one or more of the trigger frames described with reference to FIG. 7 or FIG. 8. The trigger frame 1800 is shown to contain a frame control field 1801, a duration field 1802, a receiver address (RA) field 1803, a transmitter address (TA) field 1804, a Common Info field 1805, a number of User Info fields 1806(1)-1806(*n*), an optional Padding field 1807, and a frame check sequence (FCS) field 1808. In some implementations, the trigger frame 1800 may be an UL OFDMA trigger frame. In some other implementations, the trigger frame 1800 may be an UL MU-MIMO mode trigger frame. The frame control field 1801 contains a Type field and a Sub-type field (not shown for simplicity). The Type field 1801A may store a value to indicate that the trigger frame 1800 is a control frame, and the Sub-type field 1801B may store a value indicating a type of the trigger frame 1800.

The duration field 1802 may store information indicating a duration or length of the trigger frame 1800. The RA field 1803 may store the address of a receiving device, such as one or more of the STAs of FIG. 7, 8, 19, or 20. The TA field 1804 may store the address of a transmitting device, such as the AP of FIG. 7, 8, 19, or 20. The Common Info field 1805 may store information common to one or more receiving devices. Each of the User Info fields 1806(1)-1806(*n*) may store information for a particular receiving device containing, for example, the AID of the receiving device. The Padding field 1807 may extend a length of the trigger frame 1800, for example, to give a receiving device additional time to generate a response. The FCS field 1808 may store a frame check sequence (such as for error detection).

Figure 19:
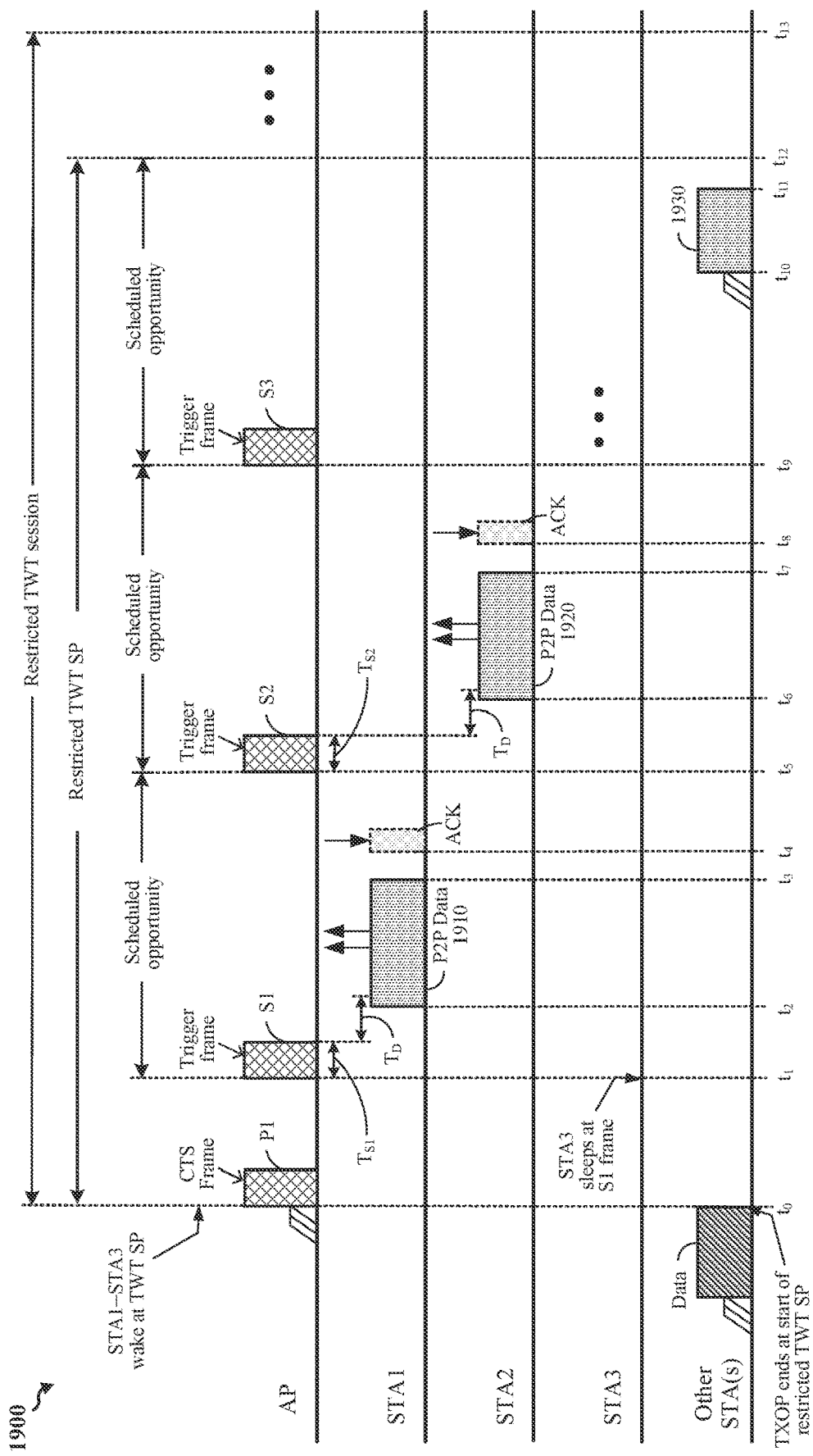
FIG. 19 shows a timing diagram depicting an example wireless communication that supports restricted TWT service periods for peer-to-peer (P2P) communications according to some other implementations.

FIG. 19 shows a timing diagram depicting an example wireless communication 1900 that supports restricted TWT service periods according to some other implementations. In the example of FIG. 19, the wireless communications 1900 may be performed between an AP, three wireless stations STA1-STA3, and one or more other STAs that are within wireless range of the AP but are not associated with the AP. The AP may be one example of the APs 102 and 602 described with reference to FIGS. 1 and 6A, respectively. Each of the associated stations STA1, STA2, and STA3 may be one example of the STAs 104 and 604 described with reference to FIGS. 1 and 6B, respectively. The other unassociated STAs may also be examples of the STAs 104 and 604 described with reference to FIGS. 1 and 6B, respectively.

Before the communications 1900 in the example of FIG. 19 begin, the AP may establish a restricted TWT session on a wireless channel. The restricted TWT session may include one or more restricted TWT service periods (SPs) during which the AP reserves the wireless channel for P2P communications among a group of STAs that are members of the restricted TWT session. For the example of FIG. 19, stations STA1-STA3 are associated with the AP and are members of the restricted TWT session. In some aspects, the stations STA1-STA3 may be admitted as members of the restricted TWT session based on their association with P2P links. The other STAs may be associated with the AP but do not belong to the restricted TWT session. For simplicity, the example of FIG. 19 depicts only three stations STA1-STA3 belonging to the restricted TWT session. In some other implementations, the restricted TWT session may include fewer or more STAs than those depicted in the example of FIG. 19.

In some instances, the group of stations STA1-STA3 belonging to the restricted TWT session may exchange P2P data or communications with one or more other wireless communication devices (not shown for simplicity) using one or more P2P links. A P2P link may be a direct link within a QoS BSS, a tunneled direct-link setup (TDLS) link, or a STA-to-STA communication in an independent basic service set (IBSS). In some instances, each of the stations STA1-STA3 may be a tunneled direct-link setup (TDLS) peer STA or a Wi-Fi Peer-to-Peer (P2P) STA.

As discussed with reference to FIG. 7, the AP may advertise the restricted TWT session using a TWT Element carried in beacon frames or other management frames (such as probe response frames, association response frames, and reassociation response frames). The TWT Element may indicate the existence of the restricted TWT session, may indicate that the restricted TWT session is associated with P2P communications or traffic, and may indicate one or more parameters of the restricted TWT session. For example, the one or more parameters may indicate the duration of each restricted TWT SP within the TWT session, the duration of the restricted TWT wake interval, the operating channel associated with the restricted TWT session, target wake times of the restricted TWT session, and/or other operation parameters or capabilities associated with the restricted TWT session. The one or more parameters may also indicate whether the restricted TWT session is a broadcast TWT session or an individual TWT session, and may indicate whether the restricted TWT session is a peer-to-peer TWT session.

In some instances, the TWT element may also include an indication for wireless communication devices that do not belong to (or do not participate in) the restricted TWT session to end their respective TXOPs and terminate any associated transmissions on the wireless channel at or before the start of each restricted TWT SP of the TWT session. For example, wireless communication devices that are not members of the restricted TWT session may decode the TWT Element carried in one or more beacon frames transmitted from the AP, and terminate their respective transmissions of UL data at or before time $t_0$ based on the received indication. In some instances, the indication to terminate TXOPs prior to the start of each restricted TWT SP may be carried in the TWT Parameter Information field of the TWT element.

Prior to time $t_0$, the stations STA1-STA3 wake up from a power-save (PS) mode or sleep state to listen for beacon frames and other management frames transmitted from the AP. Also prior to time $t_0$, the may AP contend for channel access and obtain a TXOP on the wireless channel. The AP becomes the owner of the TXOP on the wireless channel for a TXOP duration.

At time $t_0$, which may indicate a start of the restricted TWT SP, the AP transmits a protection frame P1 over the wireless channel. The protection frame P1 identifies STA1 and STA2 to transmit or receive transmissions (such as P2P communications) during the TXOP obtained by the AP. STA3 is not identified by the protection frame P1, and thus does not participate in the restricted TWT SP (although STA3 may participate in one or more subsequent TWT SPs of the restricted TWT session). The protection frame P1 may also protect transmissions on the wireless channel to or from the STAs identified by the protection frame P1. In some implementations, the protection frame P1 may protect transmissions to or from the identified stations STA1 and STA2 for an entirety of the TXOP obtained by the AP. For example, the protection frame P1 may indicate that the wireless channel is busy or unavailable to receiving devices other than STA1 and STA2 during an entirety of the TXOP. In some instances, the protection frame P1 may indicate that the other receiving devices are to set their respective network allocation vectors (NAVs) to the duration of the TXOP obtained by the AP. The other receiving devices receive the protection frame P1, determine the NAV duration indicated in the protection frame P1, and then set their respective NAVs to the duration of the TXOP obtained by the AP. In this way, the AP may protect transmissions over the wireless channel to or from STA1 and STA2 (or other STAs identified by the protection frame P1) for the entirety of the TXOP duration using a single frame.

In some other implementations, the protection frame P1 may protect the transmissions to or from the identified stations STA1 and STA2 for a time period that is less than the TXOP duration (such as a portion or percentage of the TXOP duration). For example, the protection frame P1 may indicate that the wireless channel is busy or unavailable to receiving devices other than the identified stations STA1 and STA2 for a time period that covers the transmission airtime of a first scheduling frame S1 plus an additional duration of time. In the example of FIG. 19, the transmission airtime of the first scheduling frame S1 is denoted as $T_{S1}$, the transmission airtime of a second scheduling frame S2 is denoted as $T_{S2}$, and the additional duration of time is denoted as TD. The additional duration of time $T_D$ may cover at least an initial portion of data transmissions to or from the STAs identified for a scheduled opportunity, and may ensure that the identified STAs are able to access the wireless channel to transmit or receive data during their respective scheduled opportunities. In some instances, the additional duration of time $T_D$ may be a point coordination function (PCF) interframe space (PIFS) duration or an extended interframe space (EIFS) duration. In other instances, the additional duration of time $T_D$ may be a short interframe space (SIFS) duration plus an expected response time of the respective STA. In some other instances, the additional duration of time $T_D$ may be an acknowledgement (ACK) time-out period. In this way, the protection frame P1 can protect the wireless channel for at least an initial portion of the transmission of P2P data 1910 by STA1.

The other receiving devices (such as wireless communication devices that do not belong to the restricted TWT session) may receive the protection frame P1, determine the NAV duration indicated by the protection frame P1, and then set their respective NAVs to the indicated duration. In this way, the AP may protect transmissions on the wireless channel to or from STA1 and STA2 for any suitable period of time that is smaller than the TXOP duration. In some instances, the AP may select a duration of at least one scheduled opportunity based on an amount of data to be transmitted to or from a respective STA.

In some implementations, the protection frame P1 may be a CTS or a CTS-to-self frame including a Duration field set to either the TXOP duration or the indicated time period. In some instances, the AP may set the RA field of the CTS or CTS-to-self frame to a configured MAC address that indicates a NAV duration for other receiving devices to avoid accessing or contending for access to the wireless channel. The configured MAC address carried in the RA field of the CTS or CTS-to-self frame may also indicate that STAs identified by the protection frame P1 do not set their respective NAVs. In some other implementations, the protection frame P1 may be a trigger frame. The trigger frame may include the AIDs of the STAs identified by the protection frame P1 (such as STA1 and STA2), and may protect transmissions on the wireless channel for either the TXOP duration or the indicated time period. In some instances, the trigger frame may be an MU-RTS trigger frame. In other instances, the trigger frame may be a BSRP trigger frame that can solicit a report of queued data (such as queued UL data or queued P2P data) from each of the STAs identified by the protection frame P1 (such as STA1 and STA2).

Although not shown in FIG. 19 for simplicity, each STA that receives the protection frame P1 may transmit a response frame to acknowledge receipt of the protection frame P1. The response frame may be a ACK frame, a CTS frame, or some other suitable frame that can acknowledge receipt of the first protection frame P1. In some instances, STA3 may return to a power-save state or a sleep mode at or before time $t_1$.

At time $t_1$, the AP transmits the first scheduling frame S1 over the wireless channel. In some instances, the first scheduling frame S1 may be a trigger frame such as an MU-RTS trigger frame, a BSRP trigger frame, or a PS-Poll frame. In other instances, the first scheduling frame S1 may be a CTS frame or a CTS-to-self frame. In the example of FIG. 19, the first scheduling frame S1 identifies STA1 for a first scheduled opportunity, and may schedule STA1 for P2P transmissions over the wireless channel during the first scheduled opportunity of the TXOP obtained by the AP. The first scheduling frame S1 may also indicate that other receiving devices are to set their respective NAVs to the duration of the first scheduled opportunity, to a time period that covers at least a portion of the transmission of a wireless packet by STA1, or to some other suitable duration of time. In some instances, the first scheduling frame S1 passes a first TXOP token to STA1 for a first token period, and the NAV duration indicated by the first scheduling frame S1 covers the first token period plus an IFS duration (such as a PIFS duration or an EIFS duration).

At time $t_2$, STA1 transmits P2P data 1910 over the wireless channel to another P2P STA (not shown for simplicity) based at least in part on the first scheduling frame S1. In some implementations, the AP may facilitate a P2P link between STA1 and the other P2P STA. At time $t_3$, transmission of the P2P data 1910 ends, which may also correspond to an end of the TXOP portion granted to STA1 by the AP. In some implementations, STA1 may receive an ACK frame from the other P2P STA at time $t_4$.

In some implementations, the AP may determine whether a duration of the NAV indicated by the P2P transmission 1910 is less than the NAV duration indicated by the first scheduling frame S1. If the NAV duration indicated by the P2P transmission 1910 is less than the NAV duration indicated by the first scheduling frame S1, the AP may schedule the transmission of the second scheduling frame S2 based on the end of the NAV duration indicated by the P2P transmission 1910. Otherwise, the AP may schedule the transmission of the second scheduling frame S2 based on the end of the NAV duration indicated by the first scheduling frame S1.

In some implementations, the AP may ensure a certain level of channel utilization by recovering the TXOP grant from STA1 if there is an absence of data transmissions from STA1 during the first scheduled opportunity. For example, if the AP does not detect any data transmissions from STA1 for more than a certain period of time, the AP may transmit a CF-End frame over the wireless channel. The CF-End frame may terminate the first scheduled opportunity.

In some implementations, the AP may employ repetition and failure recovery. For example, if the AP does not detect any data transmissions from STA1 within an initial time period of the first scheduled opportunity (which may indicate that the first scheduling frame S1 frame was not received by STA1 or that STA1 does not have any queued data to transmit), the AP may retransmit the first scheduling frame S1 to STA1. In some instances, the initial time period may be any suitable IFS duration. In some other instances, the initial time period may be an AIFS duration plus a minimum contention window size ($CW_{min}$). In addition, or in the alternative, the AP may transmit the second scheduling frame S2 to STA2 if the AP does not detect any data transmissions from STA1 within the initial time period. In some instances, the initial time period may be indicated by the first scheduling frame S1.

At time $t_5$, the AP transmits the second scheduling frame S2 over the wireless channel. In some instances, the second scheduling frame S2 may be a trigger frame such as an MU-RTS trigger frame, a BSRP trigger frame, or a PS-Poll frame. In other instances, the second scheduling frame S2 may be a CTS frame or a CTS-to-self frame. The second scheduling frame S2 identifies STA2, and may schedule STA2 for P2P transmissions over the wireless channel during a second scheduled opportunity of the TXOP duration. The second scheduling frame S2 may also indicate that other receiving devices are to set their respective NAVs to the duration of the second scheduled opportunity, to a time period that covers at least a portion of the transmission of a wireless packet by STA2, or to some other suitable duration of time. In some instances, the second scheduling frame S2 passes a second TXOP token to STA2 for a second token period, and the NAV duration indicated by the second scheduling frame S2 covers the second token period plus an IFS duration (such as a PIFS duration or an EIFS duration).

At time $t_6$, STA2 transmits P2P data 1920 over the wireless channel to another P2P STA (not shown for simplicity) based at least in part on the second scheduling frame S2. In some implementations, the AP may facilitate a P2P link between STA2 and the other P2P STA. At time $t_7$, transmission of the P2P data 1920 ends, which may also correspond to an end of the TXOP portion granted to STA2 by the AP. In some implementations, STA2 may receive an ACK frame from the other P2P STA at time $t_8$.

At time $t_9$, the AP may transmit a third scheduling frame S3 over the wireless channel to solicit UL transmissions during a corresponding third scheduled opportunity, and so on, until the restricted TWT SP ends at time $t_{12}$. In the example of FIG. 19, the AP may not have any queued downlink data for any of STA1-STA3, and none of the STAs identified by the third scheduling frame S3 may have queued uplink data for transmission to the AP during the third scheduled opportunity. In some implementations, the AP may monitor the wireless channel and detect an absence of data transmissions on the wireless channel during the third scheduled opportunity. In some instances, the AP may recover a remaining portion of the TXOP granted to the STA(s) identified by the third scheduling frame S3, and may permit the other STAs to access the wireless channel. In the example of FIG. 19, the other STA uses a contention-based channel access mechanism (such as an EDCA mechanism) to gain access to the wireless channel at time $t_{10}$, and transmits or receives one or more PPDUs 1930 on the wireless channel between times $t_{10}$ and $t_{11}$. At time $t_{13}$, the restricted TWT session ends.

Figure 20:
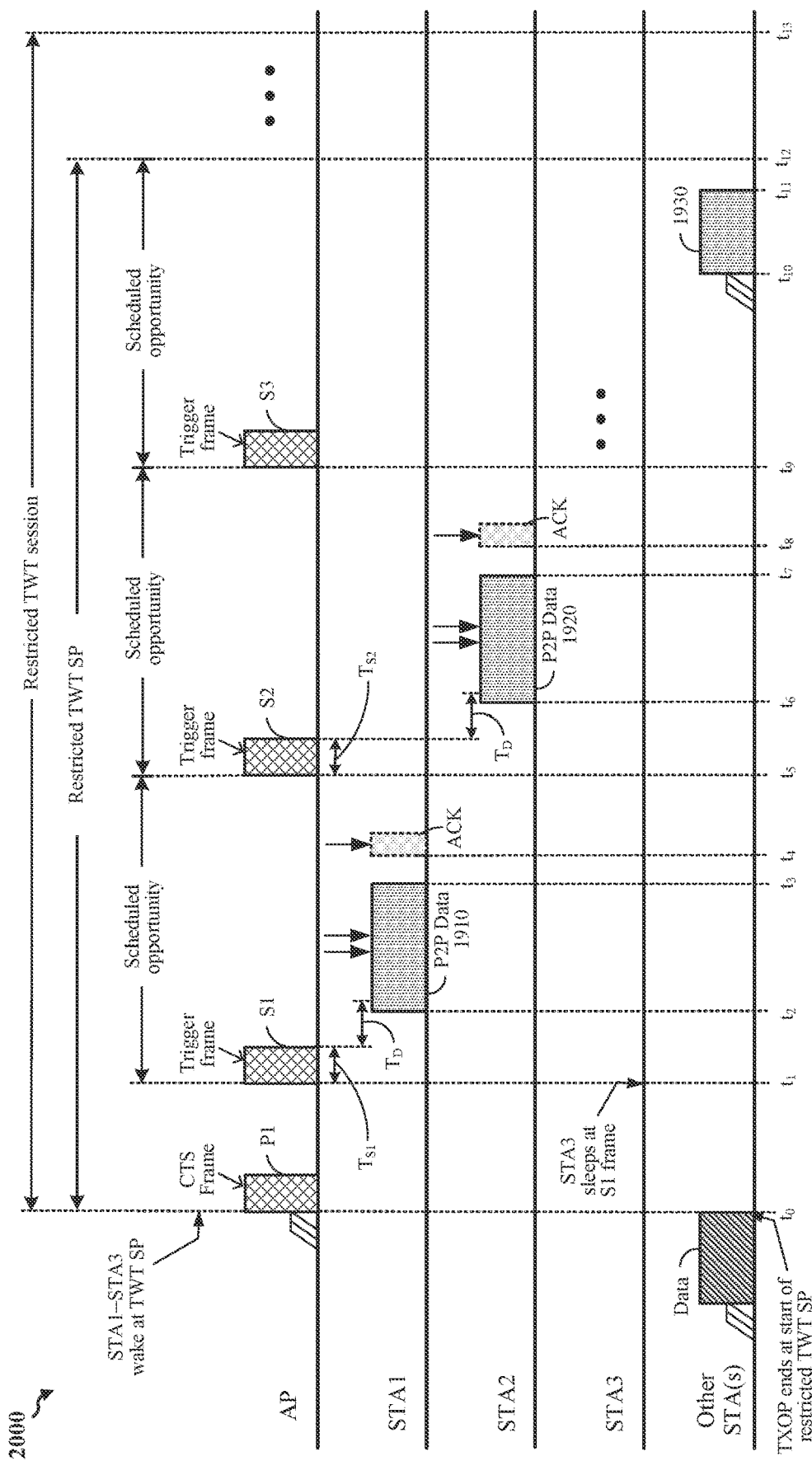
FIG. 20 shows a timing diagram depicting another example wireless communication that supports restricted TWT service periods for P2P communications according to some other implementations.

FIG. 20 shows a timing diagram depicting another example wireless communication 2000 that supports restricted TWT sessions for P2P communications according to some implementations. In the example of FIG. 20, the wireless communications 2000 may be performed between the AP and the STAs described with reference to FIG. 19. The timing diagram of FIG. 20 is similar to the timing diagram of FIG. 19 in many aspects, and differs from the timing diagram of FIG. 19 in some aspects. Specifically, while the stations STA1 and STA2 participating in the example communications 1900 of FIG. 19 transmit P2P data to one or more other wireless communication devices during the first and second respective scheduled opportunities, the stations STA1 and STA2 participating in the example communications 2000 of FIG. 20 receive P2P data from one or more other wireless communication devices during the first and second respective scheduled opportunities.

Figure 21:
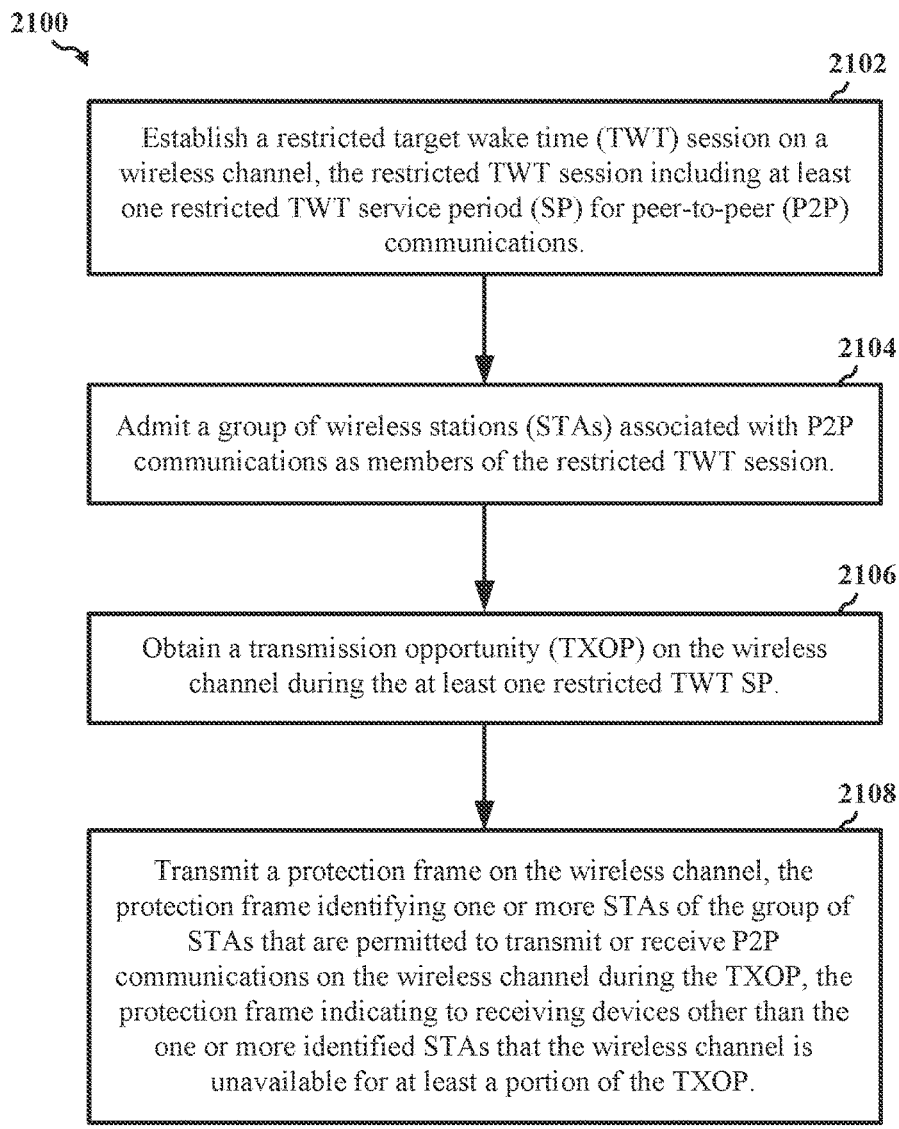
FIGS. 21-26 show flowcharts illustrating example processes for wireless communications that supports restricted TWT service periods for P2P communications according to some implementations.

FIG. 21 shows a flowchart illustrating an example process 2100 for wireless communication that supports restricted TWT service periods for P2P communications according to some implementations. The process 2100 may be performed by a wireless communication device such as the wireless communication device 500 described with reference to FIG. 5. In some implementations, the process 2100 may be performed by a wireless communication device operating as or within an AP, such as one of the APs 102 and 602 described with reference to FIGS. 1 and 6A, respectively.

For example, at block 2102, the AP establishes a restricted target wake time (TWT) session on a wireless channel, the restricted TWT session including at least one restricted TWT service period (SP) for P2P communications. At block 2104, the AP admits a group of wireless stations (STAs) associated with P2P communications as members of the restricted TWT session. At block 2106, the AP obtains a transmission opportunity (TXOP) on the wireless channel during the at least one restricted TWT SP. At block 2108, the AP transmits a protection frame over the wireless channel, the protection frame identifying one or more STAs of the group of STAs belonging to the restricted TWT session that are permitted to transmit or receive P2P communications on the wireless channel during the TXOP. The protection frame may also indicate to receiving devices other than the one or more identified STAs that the wireless channel is unavailable for at least a portion of the TXOP. In some instances, each STA of the group of STAs may be a tunneled direct-link setup (TDLS) peer STA or Wi-Fi Peer-to-Peer (P2P) STA.

In some implementations, the one or more STAs identified by the protection frame include less than all of the STAs in the group of STAs that belongs to the restricted TWT session. That is, in some instances, the protection frame may identify a subset of the group of STAs belonging to the restricted TWT session, and may permit only the STAs identified by the protection frame to contend for channel access and obtain TXOP on the wireless channel. In this way, the AP may manage or limit the number of STAs attempting to access the wireless channel at any given time, thereby reducing the likelihood of collisions on the wireless channel and increasing the likelihood of a respective STA gaining access to the wireless channel.

In some implementations, the protection frame may indicate that the wireless channel is busy or unavailable to receiving devices other than the one or more selected STAs during an entirety of the TXOP. For example, in some instances, the protection frame may indicate that the other receiving devices are to set their respective NAVs to the TXOP duration.

In some other implementations, the protection frame may indicate that the wireless channel is busy or unavailable to receiving devices other than the one or more selected STAs for a time period that is smaller than the TXOP duration. For example, the protection frame may indicate that the other receiving devices are to set their respective NAVs to the indicated time period. The indicated time period may cover a transmission airtime of the first scheduling frame plus an additional duration of time. The additional duration of time may cover at least an initial portion of data transmissions to or from the STAs identified or scheduled for a scheduled opportunity, and may ensure that the identified or scheduled STAs are able to access the wireless channel to transmit or receive data during their respective scheduled opportunities. In some instances, the additional duration of time may be a point coordination function (PCF) interframe space (PIFS) duration or an extended interframe space (EIFS) duration. In other instances, the additional duration of time may be a short interframe space (SIFS) duration plus an expected response time of the respective STA. In some other instances, the additional duration of time may be an acknowledgement (ACK) time-out period.

In some implementations, the protection frame may be a CTS frame or a CTS-to-self frame indicating that the other receiving devices are to set their respective NAVs to a time period that is smaller than the TXOP. In some aspects, the CTS frame or CTS-to-self frame includes a Duration field set to the time period. In some instances, a receiver address (RA) field of the CTS frame or CTS-to-self frame may be set to a predefined MAC address to indicate that the one or more identified STAs are permitted to access the wireless channel during the TXOP. In some other instances, the RA field of the CTS frame or CTS-to-self frame may be set to the MAC address of the identified STA.

In some other implementations, the protection frame may be a trigger frame including the AIDs of the identified STAs and a Duration field set to either the TXOP duration or the indicated time period. In some instances, the trigger frame may be an MU-RTS trigger frame. In other instances, the trigger frame may be a BSRP trigger frame. In some other instances, the trigger frame may be a CF-Poll frame.

Figure 22:
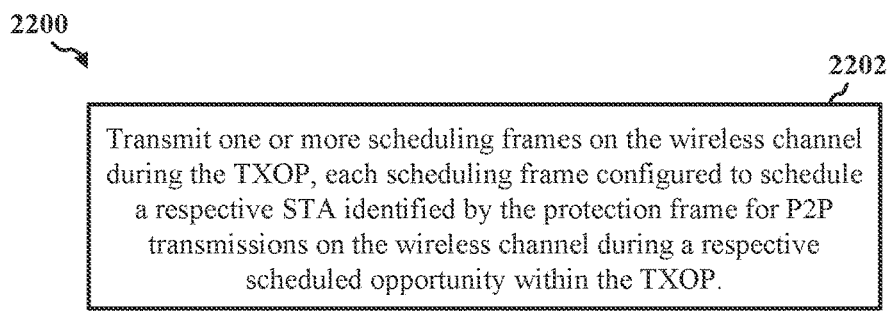

FIG. 22 shows a flowchart illustrating another example process 2200 for wireless communication that supports restricted TWT service periods for P2P communications according to some implementations. The process 2200 may be performed by a wireless communication device such as the wireless communication device 500 described with reference to FIG. 5. In some implementations, the process 2200 may be performed by a wireless communication device operating as or within an AP, such as one of the APs 102 and 602 described with reference to FIGS. 1 and 6A, respectively. In some instances, the process 2200 may be performed after transmitting the protection frame in block 2108 of the process 2100 of FIG. 21. For example, at block 2202, the AP transmits one or more scheduling frames on the wireless channel during the TXOP, each scheduling frame configured to schedule a respective STA identified by the protection frame for P2P transmissions on the wireless channel during a respective scheduled opportunity within the TXOP.

In some implementations, the scheduling frame may be a CTS frame or a CTS-to-self frame including a Duration field set to a duration of a respective scheduled opportunity. In some instances, the RA field of the CTS frame or CTS-to-self frame may be set to a MAC address of the STA identified or scheduled for the respective scheduled opportunity. The CTS frame or CTS-to-self frame may pass a TXOP token to the identified STA, and may include an indication of the TXOP token. The CTS frame or CTS-to-self frame may also include an indication that the CTS frame or CTS-to-self frame is a scheduling frame.

In other implementations, the scheduling frame may be a trigger frame including the AID of each STA identified or scheduled for the respective scheduled opportunity. In some instances, the trigger frame may be an MU-RTS trigger frame including one or more Per User Info fields indicating allowed durations of P2P transmissions from one or more respective STAs during the corresponding scheduled opportunity. In some other instances, the trigger frame may be a BSRP trigger frame including one or more Per User Info fields indicating the allowed durations of P2P transmissions from one or more respective STAs during the corresponding scheduled opportunity. In some other instances, each Per User Info field carried in the MU-RTS trigger frame or the BSRP trigger frame may indicate an amount of time that the respective STA is to delay accessing the wireless channel during the corresponding scheduled opportunity.

In some other implementations, at least one scheduling frame may be a Quality of Service (QOS) data frame or a QoS Null frame. In some instances, the QoS data frame may be a Contention Free Poll (CF-Poll) frame. The CF-Poll frame may include a TXOP Limit subfield indicating that a respective one of the selected STAs is to transmit only one data frame or one QoS Null frame after reception of the CF-Poll frame.

In some implementations, each scheduling frame may indicate that the other receiving devices are to set their respective NAVs to a duration of the respective scheduled opportunity. In this way, the AP may facilitate a P2P transmission between the STA identified by the scheduling frame and another wireless communication device during the respective scheduled opportunity. In some instances, the NAV duration indicated by the scheduling frame covers a token period plus an inter-frame space (IFS) duration. The IFS duration may be a PIFS duration or an EIFS duration. The scheduling frame may be configured to identify a first STA of the one or more STAs identified by the protection frame for transmitting P2P data over the wireless channel during the respective scheduled opportunity. In some instances, the scheduling frame passes a TXOP token to the first STA for the token period. In addition, or in the alternative, the NAV duration indicated by a last scheduling frame may cover a last token period of the TXOP.

In some implementations, the respective STA may use a listen-before-talk or listen-before-transmit (LBT) channel access mechanism to access the wireless channel during the respective scheduled opportunity. In some instances, the LBT channel access mechanism may be a clear channel assessment (CCA) without a back-off procedure, which may allow STAs granted a portion of the TXOP during a scheduled opportunity to access the wireless channel more quickly than channel access mechanisms that include a back-off procedure.

Figure 23:
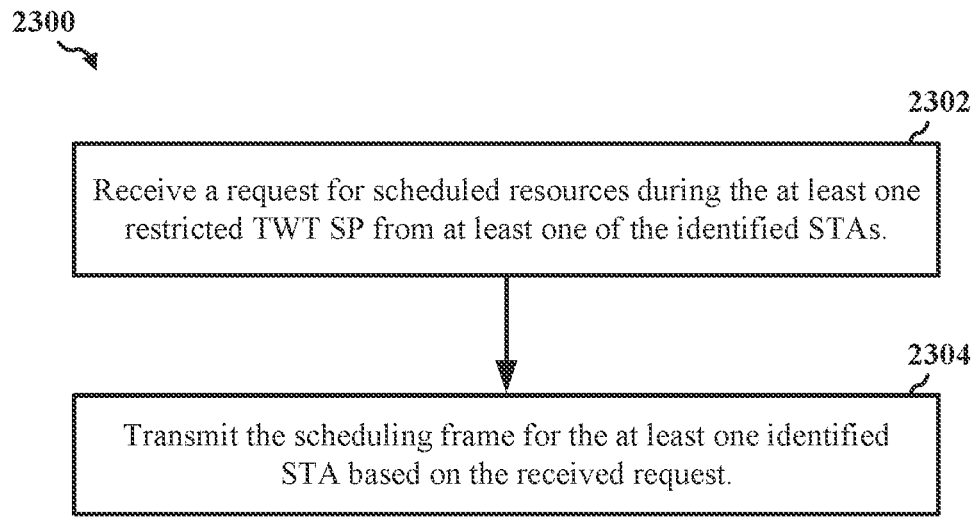

FIG. 23 shows a flowchart illustrating another example process 2300 for wireless communication that supports restricted TWT service periods for P2P communications according to some implementations. The process 2300 may be performed by a wireless communication device such as the wireless communication device 500 described with reference to FIG. 5. In some implementations, the process 2300 may be performed by a wireless communication device operating as or within an AP, such as one of the APs 102 and 602 described with reference to FIGS. 1 and 6A, respectively.

In some instances, the process 2300 may be performed after transmitting the one or more scheduling frames in block 2202 of the process 2200 of FIG. 22. For example, at block 2302, the AP receives a request for scheduled resources during the at least one restricted TWT SP from at least one of the identified STAs. At block 2304, the AP transmits the scheduling frame for the at least one identified STA based on the received request.

Figure 24:
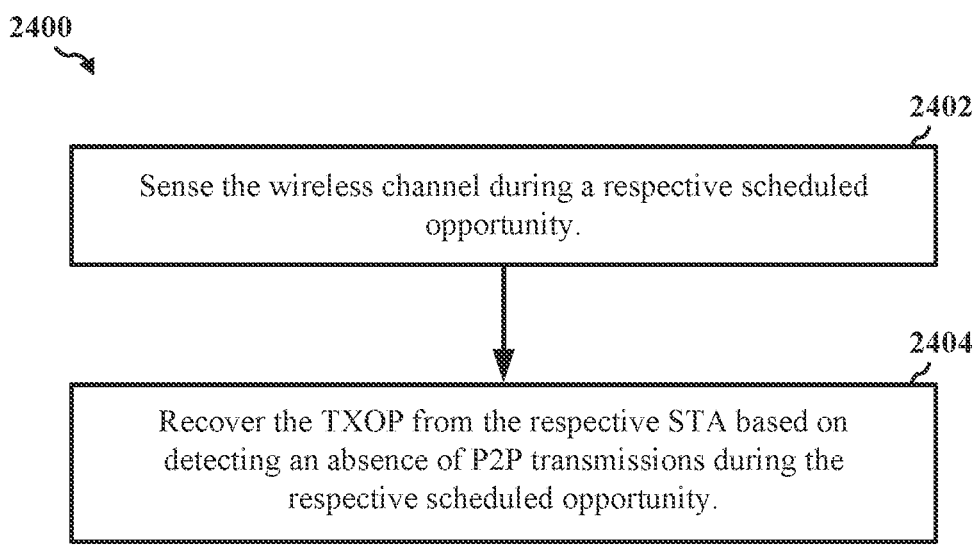

FIG. 24 shows a flowchart illustrating another example process 2400 for wireless communication that supports restricted TWT service periods for P2P communications according to some implementations. The process 2400 may be performed by a wireless communication device such as the wireless communication device 500 described with reference to FIG. 5. In some implementations, the process 2400 may be performed by a wireless communication device operating as or within an AP, such as one of the APs 102 and 602 described with reference to FIGS. 1 and 6A, respectively.

In some instances, the process 2400 may be performed between transmissions of the one or more scheduling frames in block 2202 of the process 2200 of FIG. 22. For example, at block 2402, the AP senses the wireless channel during the respective scheduled opportunity. At block 2404, the AP recovers the TXOP from the respective STA based on detecting an absence of P2P transmissions during the respective scheduled opportunity. In some instances, the AP may transmit a CF-End frame to recover the remainder of the TXOP portion.

Figure 25:
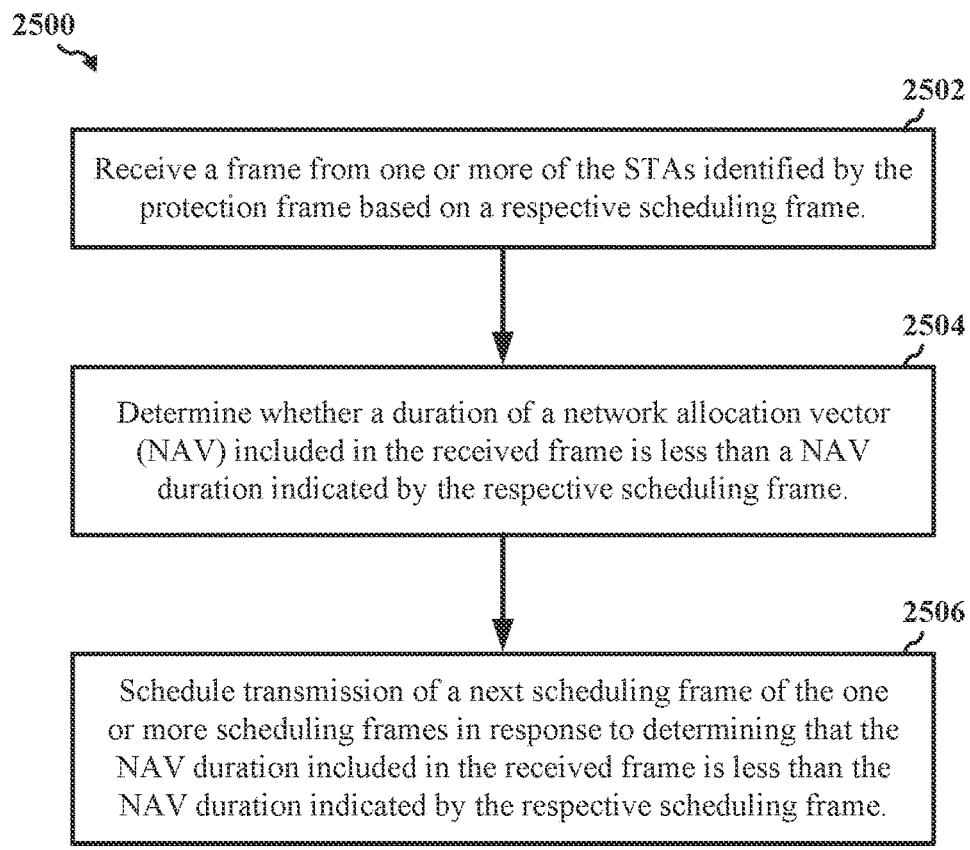

FIG. 25 shows a flowchart illustrating another example process 2500 for wireless communication that supports restricted TWT service periods for P2P communications according to some implementations. The process 2500 may be performed by a wireless communication device such as the wireless communication device 500 described with reference to FIG. 5. In some implementations, the process 2500 may be performed by a wireless communication device operating as or within an AP, such as one of the APs 102 and 602 described with reference to FIGS. 1 and 6A, respectively.

In some instances, the process 2500 may be performed after transmitting one of the scheduling frames in block 2202 of the process 2200 of FIG. 22. For example, at block 2502, the AP receives a frame from one or more of the identified STAs based on a respective scheduling frame. At block 2504, the AP determines whether a duration of a NAV included in the received frame is less than the NAV duration indicated by the respective scheduling frame. At block 2506, the AP schedules the transmission of a next scheduling frame of the one or more scheduling frames in response to determining that the NAV duration included in the received frame is less than the NAV duration indicated by the respective scheduling frame. In some implementations, the timing of the transmission of the next scheduling frame may be based on an end of the NAV duration included in the received frame (such as rather than at an end of the NAV duration indicated by the respective scheduling frame). In this way, the AP may increase medium utilization by adjusting the duration of scheduled opportunities based on data transmissions to or from the STAs identified or scheduled for the scheduled opportunities.

Figure 26:
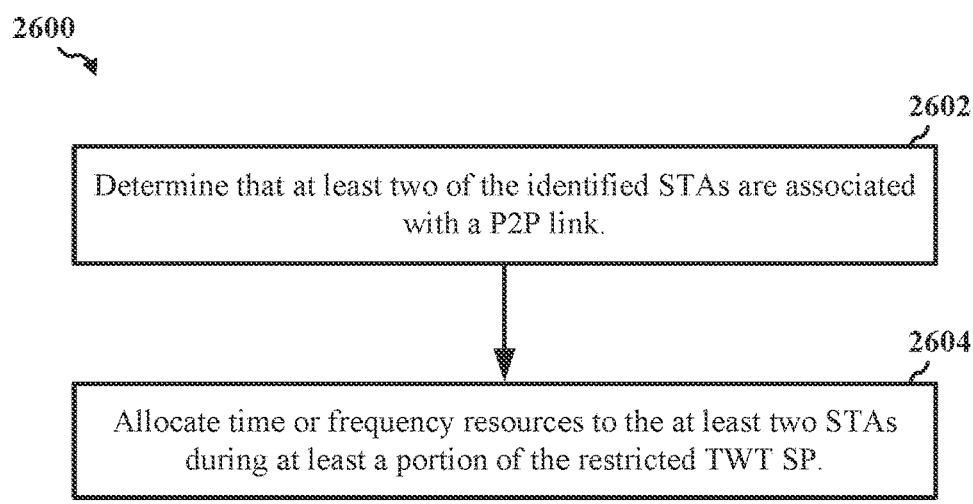

FIG. 26 shows a flowchart illustrating another example process 2600 for wireless communication that supports restricted TWT service periods for P2P communications according to some implementations. The process 2600 may be performed by a wireless communication device such as the wireless communication device 500 described with reference to FIG. 5. In some implementations, the process 2600 may be performed by a wireless communication device operating as or within an AP, such as one of the APs 102 and 602 described with reference to FIGS. 1 and 6A, respectively.

In some instances, the process 2600 may be performed after transmitting the protection frame in block 2108 of the process 2100 of FIG. 21. For example, at block 2602, the AP determines that at least two of the identified STAs are associated with a P2P link. At block 2604, the AP allocates time or frequency resources to the at least two STAs during at least a portion of the restricted TWT SP. In some instances, the P2P link may be a tunneled direct-link setup (TDLS) link on the wireless channel.

Figure 27:
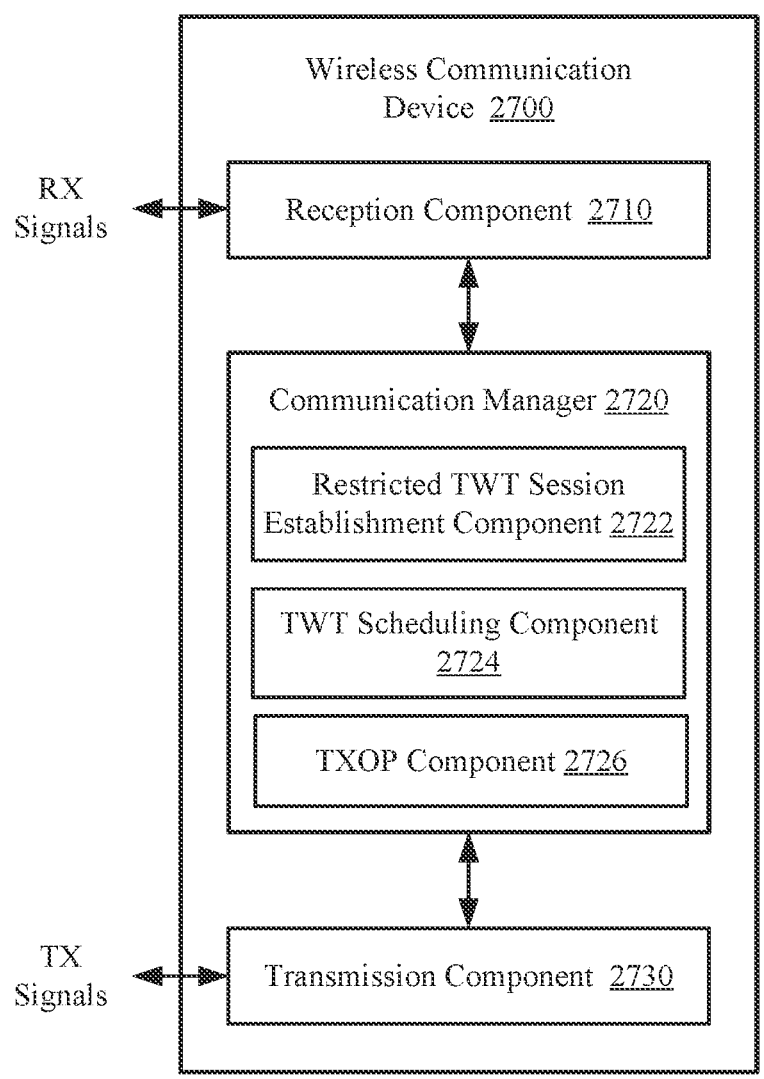
FIG. 27 shows a block diagram of an example wireless communication device according to some implementations.

FIG. 27 shows a block diagram of an example wireless communication device 2700 according to some implementations. In some implementations, the wireless communication device 2700 is configured to perform one or more of the processes described with reference to FIGS. 21-26. In some implementations, the wireless communication device 2700 can be an example implementation of the wireless communication device 500 described with reference to FIG. 5. For example, the wireless communication device 2700 can be a chip, SoC, chipset, package or device that includes at least one processor and at least one modem (for example, a Wi-Fi (IEEE 802.11) modem or a cellular modem).

The wireless communication device 2700 includes a reception component 2710, a communication manager 2720, and a transmission component 2730. The communication manager 2720 may further include a restricted TWT session establishment component 2722, a TWT scheduling component 2724, and a TXOP component 2726. Portions of one or more of the components 2722, 2724, and 2726 may be implemented at least in part in hardware or firmware. In some implementations, at least one of the components 2722, 2724, or 2726 is implemented at least in part as software stored in a memory (such as the memory 508). For example, portions of one or more of the components 2722, 2724, and 2726 can be implemented as non-transitory instructions or code executable by a processor (such as the processor 506) to perform the functions or operations of the respective component.

The reception component 2710 is configured to receive RX signals from other wireless communication devices. In some implementations, the RX signals may include UL data from one or more STAs belonging to a restricted TWT session established by the wireless communication device 2700. In some implementations, the restricted TWT session establishment component 2722 may establish a restricted TWT session that includes at least one restricted TWT SP during which the AP reserves the wireless channel for P2P communications. The restricted TWT session establishment component 2722 may also admit a group of STAs associated with P2P communications as members of the restricted TWT session. The TWT scheduling component 2724 may schedule UL transmissions from and DL transmissions to one or more of the STAs that belong to the restricted TWT session. The TXOP component 2726 may contend for channel access and obtain a TXOP during one or more TWT SPs associated with the restricted TWT session. The transmission component 2730 is configured to transmit TX signals to other wireless communication devices. In some implementations, the TX signals may include protection frames, trigger frames, and scheduling frames.

Implementation examples are described in the following numbered clauses:

1. A method for wireless communication by a wireless communication device operating as an access point (AP), including:
   establishing a restricted target wake time (TWT) session on a wireless channel, the restricted TWT session including at least one restricted TWT service period (SP) for peer-to-peer (P2P) communications;
   admitting a group of wireless stations (STAs) associated with P2P communications as members of the restricted TWT session;
   obtaining a transmission opportunity (TXOP) on the wireless channel during the at least one restricted TWT SP; and
   transmitting, on the wireless channel, a protection frame identifying one or more STAs of the group of STAs belonging to the restricted TWT session that are permitted to transmit or receive P2P communications on the wireless channel during the TXOP, the protection frame indicating to receiving devices other than the one or more identified STAs that the wireless channel is unavailable for at least a portion of the TXOP.

2. The method of clause 1, where the one or more identified STAs includes less than all of the STAs in the group of STAs belonging to the restricted TWT session.

3. The method of clauses 1 or 2, further including:
   determining that at least two of the identified STAs are associated with a P2P link; and
   allocating time or frequency resources to the at least two STAs during at least the portion of the TXOP.

4. The method of any one or more of clauses 1-3, where the P2P link includes a tunneled direct-link setup (TDLS) link on the wireless channel.

5. The method of any one or more of clauses 1-4, where the protection frame includes a clear-to-send (CTS) frame or a CTS-to-self frame indicating that the other receiving devices are to set their respective network allocation vectors (NAVs) to a time period that is smaller than the TXOP.

6. The method of clause 5, where the time period covers a transmission airtime of a scheduling frame transmitted by the AP plus one of a point coordination function (PCF) interframe space (PIFS) duration, an extended interframe space (EIFS) duration, or an acknowledgement (ACK) time-out period.

7. The method of any one or more of clauses 1-6, where the protection frame indicates that each STA of the group of STAs belonging to the restricted TWT session and not identified by the protection frame is to enter a power-save (PS) mode based on reception of the protection frame.

8. The method of clause 7, where the protection frame indicates a period of time during which each STA of the group of STAs belonging to the restricted TWT session and not identified by the protection frame is to remain in the PS mode.

9. The method of any one or more of clauses 1-8, where the protection frame comprises a trigger frame including an association identifier (AID) of each STA of the one or more identified STAs.

10. The method of any one or more of clauses 1-9, further including:
    transmitting one or more scheduling frames on the wireless channel during the TXOP, each scheduling frame configured to schedule a respective STA identified by the protection frame for P2P transmissions on the wireless channel during a respective scheduled opportunity within the TXOP.

11. The method of clause 10, where each scheduling frame indicates that receiving devices other than the respective STA are to set their respective Network Allocation Vectors (NAVs) to a duration of the respective scheduled opportunity.

12. The method of clause 10 or 11, where each scheduling frame includes a trigger frame including a Per User Info field indicating a transmission schedule of the respective STA, and where the Per User Info field further indicates an allowed duration of P2P transmissions to or from the respective STA.

13. The method of any one or more of clause 10-12, further including:
    receiving a request for scheduled resources during the at least one restricted TWT SP from at least one of the identified STAs; and
    transmitting the scheduling frame for the at least one identified STA based on the received request.

14. The method of any one or more of clauses 10-12, further including:
    sensing the wireless channel during a respective scheduled opportunity; and recovering the TXOP from the respective STA based on detecting an absence of P2P transmissions during the respective scheduled opportunity.

15. The method of any one or more of clauses 10-14, further including:
   receiving a frame from one or more of the STAs identified by the protection frame based on a respective scheduling frame;
   determining whether a duration of a network allocation vector (NAV) included in the received frame is less than a NAV duration indicated by the respective scheduling frame; and
   scheduling transmission of a next scheduling frame of the one or more scheduling frames in response to determining that the NAV duration included in the received frame is less than the NAV duration indicated by the respective scheduling frame.

16. The method of clause 15, where a timing of the transmission of the next scheduling frame is based on an end of the NAV duration included in the received frame.

17. A wireless communication device including:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:
      establish a restricted target wake time (TWT) session on a wireless channel, the restricted TWT session including at least one restricted TWT service period (SP) for peer-to-peer (P2P) communications;
      admit a group of wireless stations (STAs) associated with P2P communications as members of the restricted TWT session;
      obtain a transmission opportunity (TXOP) on the wireless channel during the at least one restricted TWT SP; and
      transmit, on the wireless channel, a protection frame identifying one or more STAs of the group of STAs belonging to the restricted TWT session that are permitted to transmit or receive P2P communications on the wireless channel during the TXOP, the protection frame indicating to receiving devices other than the one or more identified STAs that the wireless channel is unavailable for at least a portion of the TXOP.

18. The wireless communication device of clause 17, where the one or more identified STAs includes less than all of the STAs in the group of STAs belonging to the restricted TWT session.

19. The wireless communication device of clause 17 or 18, where execution of the processor-readable code is further configured to:
   determine that at least two of the identified STAs are associated with a P2P link; and
   allocate time or frequency resources to the at least two STAs during at least the portion of the TXOP.

20. The wireless communication device of clause 19, where the P2P link includes a tunneled direct-link setup (TDLS) link on the wireless channel.

21. The wireless communication device of clause 17, where the protection frame includes a clear-to-send (CTS) frame or a CTS-to-self frame indicating that the other receiving devices are to set their respective network allocation vectors (NAVs) to a time period that is smaller than the TXOP.

22. The wireless communication device of any one or more of clauses 17-21, where the protection frame indicates that each STA of the group of STAs belonging to the restricted TWT session and not identified by the protection frame is to enter a power-save (PS) mode based on reception of the protection frame.

23. The wireless communication device of clause 22, where the protection frame indicates a period of time during which each STA of the group of STAs belonging to the restricted TWT session and not identified by the protection frame is to remain in the PS mode.

24. The wireless communication device of any one or more of clauses 17-23, where execution of the processor-readable code is further configured to:
   transmit one or more scheduling frames on the wireless channel during the TXOP, each scheduling frame configured to schedule a respective STA identified by the protection frame for P2P transmissions on the wireless channel during a respective scheduled opportunity within the TXOP.

25. The wireless communication device of clause 24, where each scheduling frame indicates that receiving devices other than the respective STA are to set their respective Network Allocation Vectors (NAVs) to a duration of the respective scheduled opportunity.

26. The wireless communication device of any one or more of clauses 24-25, where each scheduling frame includes a trigger frame including a Per User Info field indicating a transmission schedule of the respective STA.

27. The wireless communication device of clause 26, where the Per User Info field indicates an allowed duration of P2P transmissions to or from the respective STA.

28. The wireless communication device of any one or more of clauses 24-27, where execution of the processor-readable code is further configured to: receive a request for scheduled resources during the at least one restricted TWT SP from at least one of the identified STAs; and transmit the scheduling frame for the at least one identified STA based on the received request.

29. The wireless communication device of any one or more of clauses 24-28, where execution of the processor-readable code is further configured to: sense the wireless channel during a respective scheduled opportunity; and recover the TXOP from the respective STA based on detecting an absence of P2P transmissions during the respective scheduled opportunity.

30. The wireless communication device of any one or more of clauses 24-29, where execution of the processor-readable code is further configured to:
   receive a frame from one or more of the STAs identified by the protection frame based on a respective scheduling frame;
   determine whether a duration of a network allocation vector (NAV) included in the received frame is less than a NAV duration indicated by the respective scheduling frame; and
   schedule transmission of a next scheduling frame of the one or more scheduling frames in response to determining that the NAV duration included in the received frame is less than the NAV duration indicated by the respective scheduling frame.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device operating as an access point (AP), comprising:
    establishing a restricted target wake time (TWT) session on a wireless channel, the restricted TWT session including at least one restricted TWT service period (SP) for peer-to-peer (P2P) communications;
    admitting a group of wireless stations (STAs) associated with P2P communications as members of the restricted TWT session;
    obtaining a transmission opportunity (TXOP) on the wireless channel during the at least one restricted TWT SP; and
    transmitting, on the wireless channel, a protection frame identifying one or more STAs of the group of STAs belonging to the restricted TWT session that are permitted to transmit or receive P2P communications on the wireless channel during the TXOP, the protection frame indicating to devices other than the one or more identified STAs that the wireless channel is unavailable for at least a portion of the TXOP.

2. The method of claim 1, wherein the one or more identified STAs includes less than all of the STAs in the group of STAs belonging to the restricted TWT session.

3. The method of claim 1, further comprising:
    determining that at least two of the identified STAs are associated with a P2P link; and
    allocating time or frequency resources to the at least two STAs during at least the portion of the TXOP.

4. The method of claim 3, wherein the P2P link comprises a tunneled direct-link setup (TDLS) link on the wireless channel.

5. The method of claim 1, wherein the protection frame comprises a clear-to-send (CTS) frame or a CTS-to-self frame indicating that the other receiving devices are to set their respective network allocation vectors (NAVs) to a time period that is smaller than the TXOP.

6. The method of claim 5, wherein the time period covers a transmission airtime of a scheduling frame transmitted by the AP plus one of a point coordination function (PCF) interframe space (PIFS) duration, an extended interframe space (EIFS) duration, or an acknowledgement (ACK) timeout period.

7. The method of claim 1, wherein the protection frame indicates that each STA of the group of STAs belonging to the restricted TWT session and not identified by the protection frame is to enter a power-save (PS) mode based on reception of the protection frame.

8. The method of claim 7, wherein the protection frame indicates a period of time during which each STA of the group of STAs belonging to the restricted TWT session and not identified by the protection frame is to remain in the PS mode.

9. The method of claim 1, wherein the protection frame comprises a trigger frame including an association identifier (AID) of each STA of the one or more identified STAs.

10. The method of claim 1, further comprising:
    transmitting one or more scheduling frames on the wireless channel during the TXOP, each scheduling frame configured to schedule a respective STA identified by the protection frame for P2P transmissions on the wireless channel during a respective scheduled opportunity within the TXOP.

11. The method of claim 10, wherein each scheduling frame indicates that receiving devices other than the respective STA are to set their respective Network Allocation Vectors (NAVs) to a duration of the respective scheduled opportunity.

12. The method of claim 10, wherein each scheduling frame comprises a trigger frame including a Per User Info field indicating a transmission schedule of the respective STA, and wherein the Per User Info field further indicates an allowed duration of P2P transmissions to or from the respective STA.

13. The method of claim 10, further comprising:
receiving a request for scheduled resources during the at least one restricted TWT SP from at least one of the identified STAs; and
transmitting the scheduling frame for the at least one identified STA based on the received request.

14. The method of claim 10, further comprising:
sensing the wireless channel during a respective scheduled opportunity; and
recovering the TXOP from the respective STA based on detecting an absence of P2P transmissions during the respective scheduled opportunity.

15. The method of claim 10, further comprising:
receiving a frame from one or more of the STAs identified by the protection frame based on a respective scheduling frame;
determining whether a duration of a network allocation vector (NAV) included in the received frame is less than a NAV duration indicated by the respective scheduling frame; and
scheduling transmission of a next scheduling frame of the one or more scheduling frames in response to determining that the NAV duration included in the received frame is less than the NAV duration indicated by the respective scheduling frame.

16. The method of claim 15, wherein a timing of the transmission of the next scheduling frame is based on an end of the NAV duration included in the received frame.

17. A wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
establish a restricted target wake time (TWT) session on a wireless channel, the restricted TWT session including at least one restricted TWT service period (SP) for peer-to-peer (P2P) communications;
admit a group of wireless stations (STAs) associated with P2P communications as members of the restricted TWT session;
obtain a transmission opportunity (TXOP) on the wireless channel during the at least one restricted TWT SP; and
transmit, on the wireless channel, a protection frame identifying one or more STAs of the group of STAs belonging to the restricted TWT session that are permitted to transmit or receive P2P communications on the wireless channel during the TXOP, the protection frame indicating to receiving devices other than the one or more identified STAs that the wireless channel is unavailable for at least a portion of the TXOP.

18. The wireless communication device of claim 17, wherein the one or more identified STAs includes less than all of the STAs in the group of STAs belonging to the restricted TWT session.

19. The wireless communication device of claim 17, wherein execution of the processor-readable code is further configured to:
determine that at least two of the identified STAs are associated with a P2P link;
and allocate time or frequency resources to the at least two STAs during at least the portion of the TXOP.

20. The wireless communication device of claim 19, wherein the P2P link comprises a tunneled direct-link setup (TDLS) link on the wireless channel.

21. The wireless communication device of claim 17, wherein the protection frame comprises a clear-to-send (CTS) frame or a CTS-to-self frame indicating that the other receiving devices are to set their respective network allocation vectors (NAVs) to a time period that is smaller than the TXOP.

22. The wireless communication device of claim 17, wherein the protection frame indicates that each STA of the group of STAs belonging to the restricted TWT session and not identified by the protection frame is to enter a power-save (PS) mode based on reception of the protection frame.

23. The wireless communication device of claim 22, wherein the protection frame indicates a period of time during which each STA of the group of STAs belonging to the restricted TWT session and not identified by the protection frame is to remain in the PS mode.

24. The wireless communication device of claim 17, wherein execution of the processor-readable code is further configured to:
transmit one or more scheduling frames on the wireless channel during the TXOP, each scheduling frame configured to schedule a respective STA identified by the protection frame for P2P transmissions on the wireless channel during a respective scheduled opportunity within the TXOP.

25. The wireless communication device of claim 24, wherein each scheduling frame indicates that receiving devices other than the respective STA are to set their respective Network Allocation Vectors (NAVs) to a duration of the respective scheduled opportunity.

26. The wireless communication device of claim 24, wherein each scheduling frame comprises a trigger frame including a Per User Info field indicating a transmission schedule of the respective STA.

27. The wireless communication device of claim 26, wherein the Per User Info field further indicates an allowed duration of P2P transmissions to or from the respective STA.

28. The wireless communication device of claim 24, wherein execution of the processor-readable code is further configured to:
receive a request for scheduled resources during the at least one restricted TWT SP from at least one of the identified STAs; and
transmit the scheduling frame for the at least one identified STA based on the received request.

29. The wireless communication device of claim 24, wherein execution of the processor-readable code is further configured to:
sense the wireless channel during a respective scheduled opportunity; and
recover the TXOP from the respective STA based on detecting an absence of P2P transmissions during the respective scheduled opportunity.

30. The wireless communication device of claim 24, wherein execution of the processor-readable code is further configured to:
receive a frame from one or more of the STAs identified by the protection frame based on a respective scheduling frame;
determine whether a duration of a network allocation vector (NAV) included in the received frame is less than a NAV duration indicated by the respective scheduling frame; and schedule transmission of a next scheduling frame of the one or more scheduling frames in response to determining that the NAV duration included in the received frame is less than the NAV duration indicated by the respective scheduling frame.

* * * * *